US009548845B2

United States Patent
Yi et al.

(10) Patent No.: US 9,548,845 B2
(45) Date of Patent: Jan. 17, 2017

(54) METHOD AND APPARATUS FOR TRANSMITTING/RECEIVING DATA IN WIRELESS COMMUNICATION SYSTEM

(71) Applicant: LG ELECTRONICS INC., Seoul (KR)

(72) Inventors: Yunjung Yi, Seoul (KR); Suckchel Yang, Seoul (KR); Joonkui Ahn, Seoul (KR); Dongyoun Seo, Seoul (KR); Inkwon Seo, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,540

(22) PCT Filed: Nov. 1, 2013

(86) PCT No.: PCT/KR2013/009863
§ 371 (c)(1),
(2) Date: Apr. 29, 2015

(87) PCT Pub. No.: WO2014/069944
PCT Pub. Date: May 8, 2014

(65) Prior Publication Data
US 2015/0296518 A1    Oct. 15, 2015

Related U.S. Application Data

(60) Provisional application No. 61/721,473, filed on Nov. 1, 2012, provisional application No. 61/808,211, filed on (Continued)

(51) Int. Cl.
*H04L 5/00* (2006.01)
*H04W 24/08* (2009.01)
(Continued)

(52) U.S. Cl.
CPC .......... *H04L 5/0048* (2013.01); *H04L 5/0007* (2013.01); *H04W 4/005* (2013.01); *H04W 24/08* (2013.01);
(Continued)

(58) Field of Classification Search
CPC ... H04L 5/0048; H04W 24/08; H04W 72/042; H04W 72/044; H04W 72/048; H04W 72/0473
See application file for complete search history.

(56) References Cited

U.S. PATENT DOCUMENTS

2010/0192035 A1* 7/2010 Sagfors ................. H04L 1/1819
714/748
2011/0243075 A1 10/2011 Luo et al.
(Continued)

FOREIGN PATENT DOCUMENTS

KR    10-2011-0083547 A    7/2011
WO    2011/162565 A2    12/2011

OTHER PUBLICATIONS

"3rd Generation Partnership Project;Technical Specification Group Radio Access Network;Study on provision of low-cost MTC UEs based on LTE"; 3GPP TR 36.888 V2.0.0 (Jun. 2012).

*Primary Examiner* — Albert T Chou
(74) *Attorney, Agent, or Firm* — Dentons US LLP

(57) ABSTRACT

Disclosed is a method and apparatus for transmitting/receiving data in a wireless communication system. The method includes: a terminal transmitting a coverage enhancement request or capability information for the terminal; a base station determining a channel setting for the terminal based on the transmitted request or information; and transmitting downlink data and performing random access on the basis of the determined channel setting. Namely, a scheme for adap-
(Continued)

tively transmitting and receiving data in consideration of the coverage of the terminal is proposed.

15 Claims, 25 Drawing Sheets

Related U.S. Application Data on Apr. 4, 2013, provisional application No. 61/749,878, filed on Jan. 7, 2013, provisional application No. 61/751,269, filed on Jan. 11, 2013, provisional application No. 61/819,497, filed on May 3, 2013, provisional application No. 61/862,956, filed on Aug. 6, 2013.

(51) Int. Cl.
*H04W 72/04* (2009.01)
*H04W 4/00* (2009.01)

(52) U.S. Cl.
CPC ......... *H04W 72/042* (2013.01); *H04W 72/044* (2013.01); *H04W 72/048* (2013.01); *H04W 72/0473* (2013.01); *H04W 72/0446* (2013.01)

(56) References Cited

U.S. PATENT DOCUMENTS

| | | |
|---|---|---|
| 2011/0310769 A1 | 12/2011 | Lee et al. |
| 2012/0099543 A1 | 4/2012 | Yang et al. |
| 2014/0098761 A1* | 4/2014 | Lee ..................... H04W 74/006 370/329 |
| 2014/0126549 A1* | 5/2014 | Beale ................... H04W 16/08 370/336 |
| 2015/0043445 A1* | 2/2015 | Xiong .................. H04W 16/26 370/329 |
| 2015/0078188 A1* | 3/2015 | Xu ....................... H04W 52/367 370/252 |

* cited by examiner

1st radio frame (2410)

2nd radio frame (2420)

METHOD AND APPARATUS FOR TRANSMITTING/RECEIVING DATA IN WIRELESS COMMUNICATION SYSTEM

This application is a 35 USC §371 National Stage entry of International Application No. PCT/KR2013/009863 filed on Nov. 1, 2013 and claims priority to U.S. Provisional Application No. 61/721,473 filed Nov. 1, 2012, U.S. Provisional Application No. 61/749,878 filed Jan. 7, 2013, U.S. Provisional Application No. 61/751,269 filed Jan. 11, 2013, U.S. Provisional Application No. 61/808,211 filed Apr. 4, 2013, U.S. Provisional Application No. 61/819,497 filed May 3, 2013, and U.S. Provisional Application No. 61/862,956 filed Aug. 6, 2013 all of which are incorporated by reference in their entirety herein.

BACKGROUND OF THE INVENTION

Field of the Invention

The present invention relates to wireless communication and, more particularly, to a method and apparatus for transmitting and receiving data in a wireless communication system.

Related Art

Recently, the necessity to easily obtain and transfer information and data as necessary by connecting peripheral things (objects) via a network, without limitations in a location or a time, has increased. In line with this, machine-to-machine/Internet of things (IoT) allowing for the provision and use of various services according to user demand has emerged as a major issue for next-generation communication market. Initial M2M started from a sensor and radio frequency identification (RFID) network targeting a partial area. Recently, however, an interest in M2M based on a mobile communication network in consideration of mobility of things, an extensive service area including the sea s well as islands and mountain regions, ease in network operation and maintenance, security for data transmission with high reliability, and guarantee of quality of service (QoS) tend to increase. The 3GPP, a mobile communication standardization group, which started to research M2M in 2005, has conducted a full-fledged standardization under the title of machine type communications (MTC). Here, machine refers to an entity not requiring human beings' direct manipulation or intervention and MTC refers to data communication including one or more machines.

For example, a smart meter equipped with a mobile communication module, a vending machine, and the like, may be included in MTC, and recently, a smartphone, or the like, automatically accessing a network to perform communication without user manipulation and intervention according to user locations or situations has been considered as a mobile terminal machine having the MTC function. In addition, an MTC device such as an IEEE 802.15 WPAN (wireless personal area network)-based micro-sensor or a gateway connected to RFID, or the like, has also been considered.

Thus, in order to accommodate numerous MTC devices transmitting and receiving small amounts of data, an existing mobile communication network requires different identifiers and address systems used in an existing communication system, and in a communication environment in which a plurality of communication devices coexist, a novel communication mechanism in consideration of a more effective communication scheme and cost is required.

SUMMARY OF THE INVENTION

The present invention provides a method and apparatus for transmitting and receiving data in a wireless communication system.

The present invention also provides a method and apparatus for performing communication by applying a variable parameter in consideration of characteristics of a terminal in a wireless communication system.

In an aspect, a method of a terminal transmitting and receiving data in a wireless communication system may include: transmitting capability information of the terminal; checking a channel configuration regarding the terminal determined by a base station (BS) according to the transmitted capability information; and transmitting and receiving data according to the checked channel configuration, wherein the channel configuration includes a setting regarding a physical random access channel (PRACH), and setting of the PRACH includes a period having a value longer than a PRACH configuration period regarding a legacy terminal and includes information regarding a repetition number of the PRACH varied according to a coverage enhancement request from the terminal.

In another aspect, an apparatus for receiving downlink data in a wireless communication system may include: a radio frequency (RF) unit configured to transmit and receive a signal to and from a base station (BS); and a processor connected to the RF unit and configured to process the signal, wherein the processor transmits a coverage enhancement request to the BS, checks a downlink transmission configuration regarding the terminal determined by the BS on the basis of the coverage enhancement request, and receives downlink data from the BS according to the downlink transmission configuration, and the processor checks a setting regarding a reference signal and a setting regarding a transmission time interval (TTI) bundling according to the downlink transmission configuration, and the setting regarding the reference signal is a setting regarding a resource allocation of the reference signal for demodulating the downlink data based on the coverage enhancement request and the setting regarding TTI bundling is checking information regarding the number of continuous transmission of the downlink data based on the coverage enhancement request.

According to the present invention, a scheme of adaptively transmitting and receiving data according to coverage of a terminal in a wireless communication system having variable coverage according to capability of the terminal and/or a location of the terminal. Accordingly, efficiency of data transmission in the entire system can be enhanced. Also, since data is adaptively transmitted and received according to capability of a terminal in a communication environment mixed with a legacy terminal, limited radio resource may be effectively used. Thus, system efficiency of the overall system can be enhanced.

DESCRIPTION OF EXEMPLARY EMBODIMENTS

A wireless device may be fixed or mobile and may be referred to by other names such as user equipment (UE), mobile station (MS), mobile terminal (MT), user terminal (UT), subscriber station (SS), personal digital assistant (PDA), wireless modem, handheld device, terminal, wireless terminal, and the like. The wireless device may be a device supporting only data communication like a machine-type-communication (MTC).

A base station generally refers to a fixed station that communicates with a wireless device and may be referred to by other names such as evolved-node B (eNB), base transceiver system (BTS), access point (AP), and the like.

Hereinafter, operations of a terminal and/or a base station in the 3GPP LTE (long term evolution), or 3GPP LTE-A (advanced) defined on the basis of each release of 3GPP (3rd Generation Partnership Project) TS (Technical Specification). Also, the present invention may also be applied to various wireless communication networks, rather than to the 3GPP LTE/3GPP LTE-A.

Figure 1:
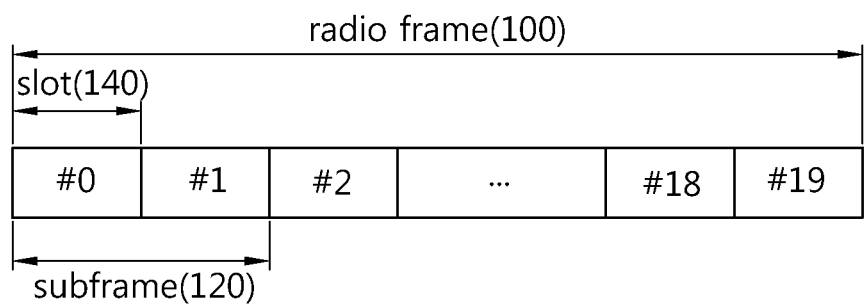
FIG. 1 illustrates a structure of a radio frame to which the present invention is applied.

FIG. 1 shows the structure of a radio frame in 3GPP LTE.

Referring to FIG. 1, the radio frame includes 10 subframes 120, and one subframe includes two slots 140. The radio frame may be indexed based on slot 140, that is, from slot #0 to #19 or may be indexed based on subframe 120, that is, from subframe #0 to subframe #9. For example, subframe #0 may include slot #0 and slot #1.

A time taken for transmitting one subframe 120 is called a transmission time interval (TTI). The TTI may be a scheduling basis for a data transmission. For example, a radio frame may have a length of 10 ms, a subframe may have a length of 1 ms, and a slot may have a length of 0.5 ms.

One slot 140 includes a plurality of orthogonal frequency division multiplexing (OFDM) symbols in a time domain and a plurality of subcarriers in a frequency domain. In LTE, a BS uses OFDMA as an access method in downlink channel. The OFDM symbols are used to express a symbol period, and may be called by other names depending on a multiple-access scheme. For example, in an uplink channel in which a wireless device transmits data to a BS, a single carrier-frequency division multiple access (SC-FDMA) may be used. The symbol section in which data is transmitted through uplink channel may be referred to as a SC-FDMA symbol.

The structure of radio frame 100 introduced in FIG. 1 is an embodiment for the frame structure. Accordingly, new radio frame format may be defined by changing the number of subframes 120, the number of slots 140 included in the subframe 120, or the number of OFDM symbols included in the slot 140.

In the radio frame structure, the number of symbols included in a slot may be changed depending on which cyclic prefix (CP) is used. For example, when the radio frame uses a normal CP, one slot may include seven OFDM symbols. When the radio frame uses an extended CP, one slot may include six OFDM symbols.

The wireless communication system may be divided into a frequency division duplex (FDD) scheme and a time division duplex (TDD) scheme. According to the FDD scheme, an uplink transmission and a downlink transmission may be performed based on different frequency bands. According to the TDD scheme, an uplink transmission and a downlink transmission may be performed based on the same frequency band by using time division scheme. A channel response of the TDD scheme is substantially reciprocal since it uses the same frequency band. That is, in TDD scheme, a downlink channel response and an uplink channel response are almost the same in a given frequency band. Thus, the TDD-based wireless communication system may obtain the channel state information from the channel state information of uplink channel. In the TDD scheme, the entire frequency band is time-divided for uplink and downlink transmissions, so a downlink transmission by the BS and an uplink transmission by the wireless device cannot be simultaneously performed.

Figure 2:
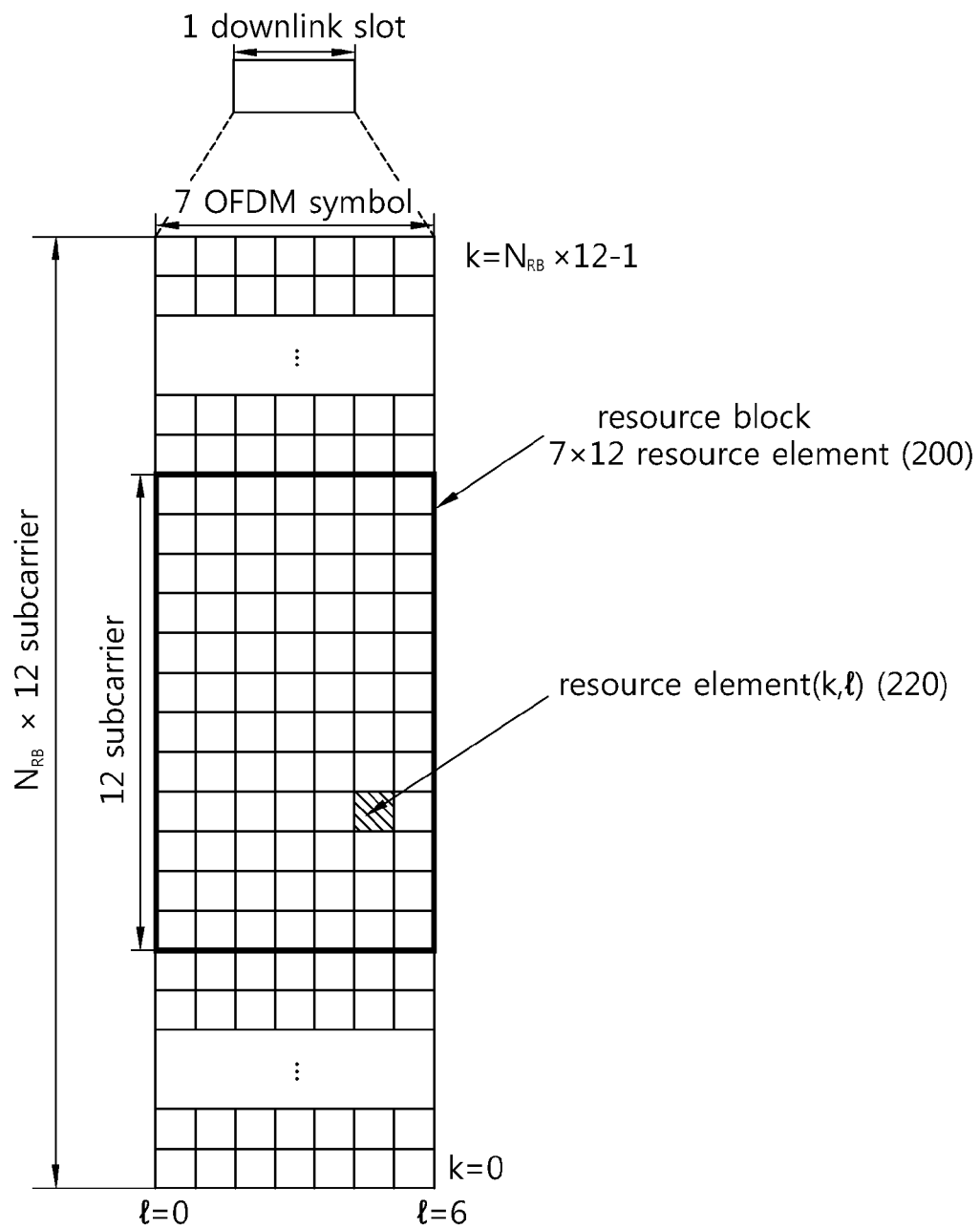
FIG. 2 is a view illustrating an example of a resource grid regarding a downlink slot, to which the present invention is applied.

FIG. 2 is a view illustrating an example of a resource grid for a downlink slot.

The downlink slot includes multiple OFDM symbols in a time domain, and includes NRB resource blocks in a frequency domain. NRB as a number of a resource block within the downlink slot is determined depending on downlink transmission bandwidth configured at a cell. For example, In a LTE system, NRB may be a value of 6 to 110 according to transmission bandwidth in use. A resource block 200 may include a plurality of subcarriers in the frequency domain. An uplink slot may have a structure same as that of the downlink slot.

Each element on the resource grid is referred to as a resource element 200. The resource element 220 on the resource grid can be identified by an index pair (k, l). Here, k (k=0, ..., $N_{RB} \times 12-1$) is the index of the subcarrier in the frequency domain, and l (l=0, ..., 6) is the indices of the OFDM symbols in the time domain.

Here, one resource block 200 may include 7 OFDM symbols in the time domain and 7×12 resource elements 220 composed of 12 subcarriers in the frequency domain. Such size is just an example, and it is possible that the number of subcarriers and OFDM symbols constructing one resource block 200 varies. The resource block pair indicate a resource unit including two resource blocks.

The number of the OFDM symbols included in one slot may vary depending on CP as mentioned above. In addition, the number of the resource block included in one slot may vary according to the size of the entire frequency bandwidth.

Figure 3:
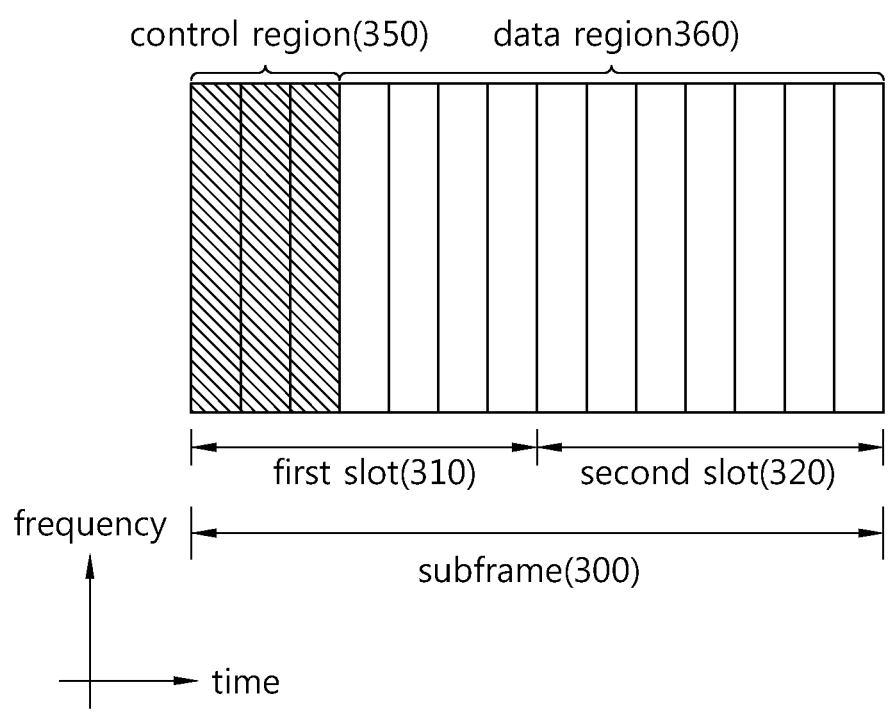
FIG. 3 is a view illustrating a structure of a downlink subframe to which the present invention is applied.

FIG. 3 is a view illustrating the structure of a downlink subframe.

The downlink subframe may be identified by two slots 310, 320 based on time. Each slot 310 or 320 includes 7 OFDM symbols in a normal CP. A resource region corresponding to 3 OFDM symbols (maximum 4 OFDM symbols for 1.4 MHz bandwidth), which arrive first, in the first slot may be used as a control region 350. Remaining OFDM symbols may be used as a data region 360 to which a traffic channel such as a physical downlink shared channel (PDSCH) is assigned.

PDCCH, for example, may be the control channel for transmitting information on resource allocation and a transmit format in a downlink-shared channel (DL-SCH), uplink shared channel (UL-SCH) resource allocation, information on paging on PCH, information on a system on the DL-SCH, and information on resource allocation for upper layer control messages such as random access response over the PDSCH, a transmit power control command set for individual UEs within a random UE group and voice over internet protocol (VoIP) activation. Multiple units for transmitting PDCCH data may be defined within the control region 350. A UE may monitor a plurality of units for transmitting PDCCH data to obtain control data. For example, PDCCH data may be transmitted to the UE based on an aggregation of one or more continuous control channel elements (CCE). The CCE may be one unit for transmitting PDCCH data. The CCE may include a plurality of resource element groups. The resource element group is a resource unit including available 4 resource elements.

A base station determines a PDCCH format based on downlink control information (DCI), and attaches a cyclic redundancy check (CRC) to the control information. The CRC is masked with a unique identifier (referred to as a radio network temporary identifier (RNTI)) according to an owner or a usage. If PDCCH is for a specific UE, a unique identifier of the UE, e.g., C-RNTI (cell-RNTI), may be masked to the CRC. IF PDCCH is for a paging message, an identifier indicating paging, e.g., P-RNTI (paging-RNTI), may be masked to the CRC. If PDCCH is for a system information block (SIB), a system information-RNTI (SI-RNTI)) may be masked to the CRC. In order to indicate random access response as response for a random access preamble of a UE, a random access-RNTI may be masked to the CRC.

Figure 4:
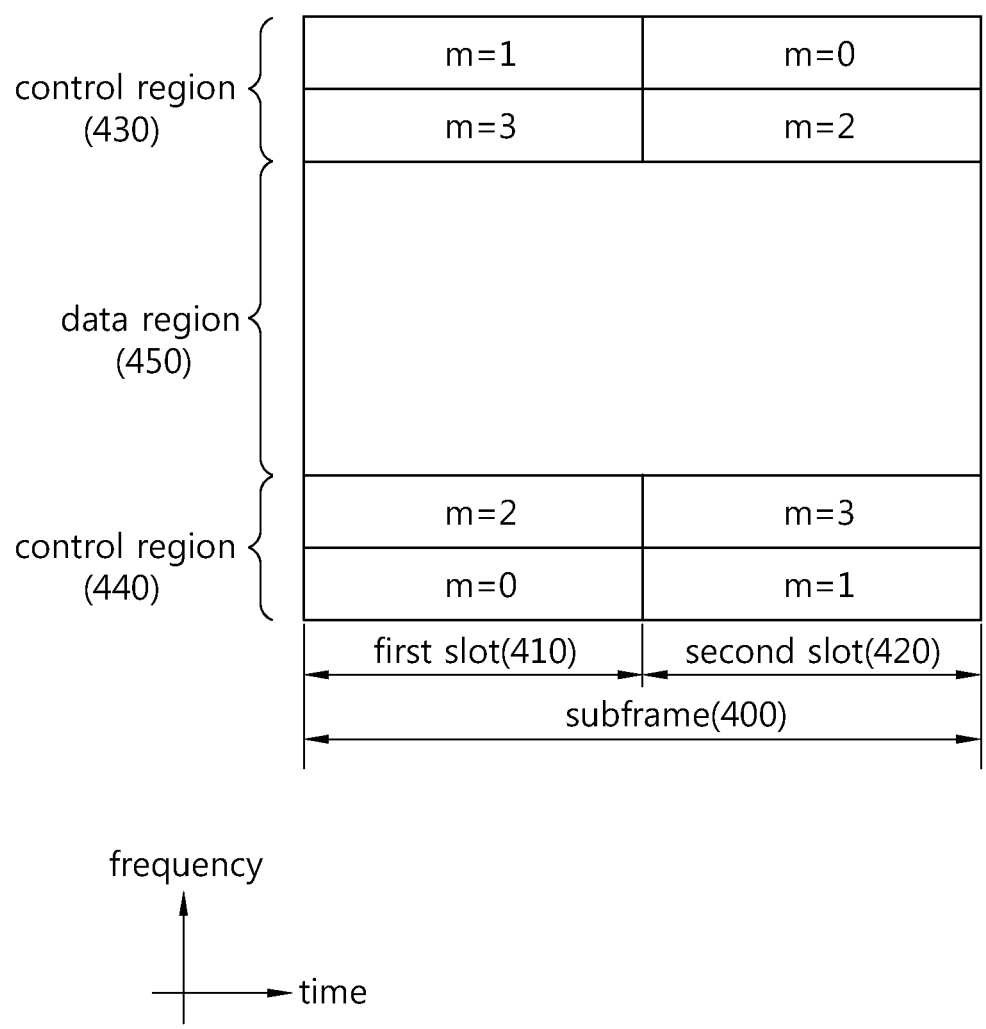
FIG. 4 is a view illustrating a structure of an uplink subframe, to which the present invention is applied.

FIG. 4 is a view illustrating a structure of an uplink subframe.

An uplink subframe may be divided into control regions 430 and 440 and a data region 450 with respect to a frequency domain. A physical uplink control channel (PUCCH) for transmitting uplink control information is allocated to the control regions 430 and 440. A physical uplink shared channel (PUSCH) for transmitting data is allocated to the data region 450. When indicated in a higher layer, a terminal may support simultaneously transmission of the PUSCH and the PUCCH.

A PUCCH for a single terminal may be allocated in units of RB pairs in a subframe 400. Resource blocks belonging to the resource block pairs may be allocated to different subcarriers in each of a first slot 410 and a second slot 420. A frequency occupied by resource blocks belonging to a resource block pair allocated to the PUCCH is changed with respect to a slot boundary. Such a PUCCH allocation method is called a frequency hopping method. A terminal may transmit different subcarriers over time to obtain a frequency diversity gain. m is a position index indicating a logical frequency region position of the resource block pair allocated to the PUCCH within a subframe.

Uplink control information transmitted on a PUCCH may include HARQ (hybrid automatic repeat request) ACK (acknowledgement)/NACK (non-acknowledgement), a CQI (channel quality indicator) indicating a downlink channel state, and SR (scheduling request) as an uplink radio resource allocation request.

A PUSCH is a channel mapped to UL-SCH (uplink shared channel) as a transport channel. Uplink data transmitted on a PUSCH may be a transport block as a data block of a UL-SCH transmitted during a TTI. The transport block may include user information. Also, control information multiplexed to data may include CQI, PMI (precoding matrix indicator), HARQ, RI (rank indicator), and the like. Also, uplink data may include only control information.

Figure 5:
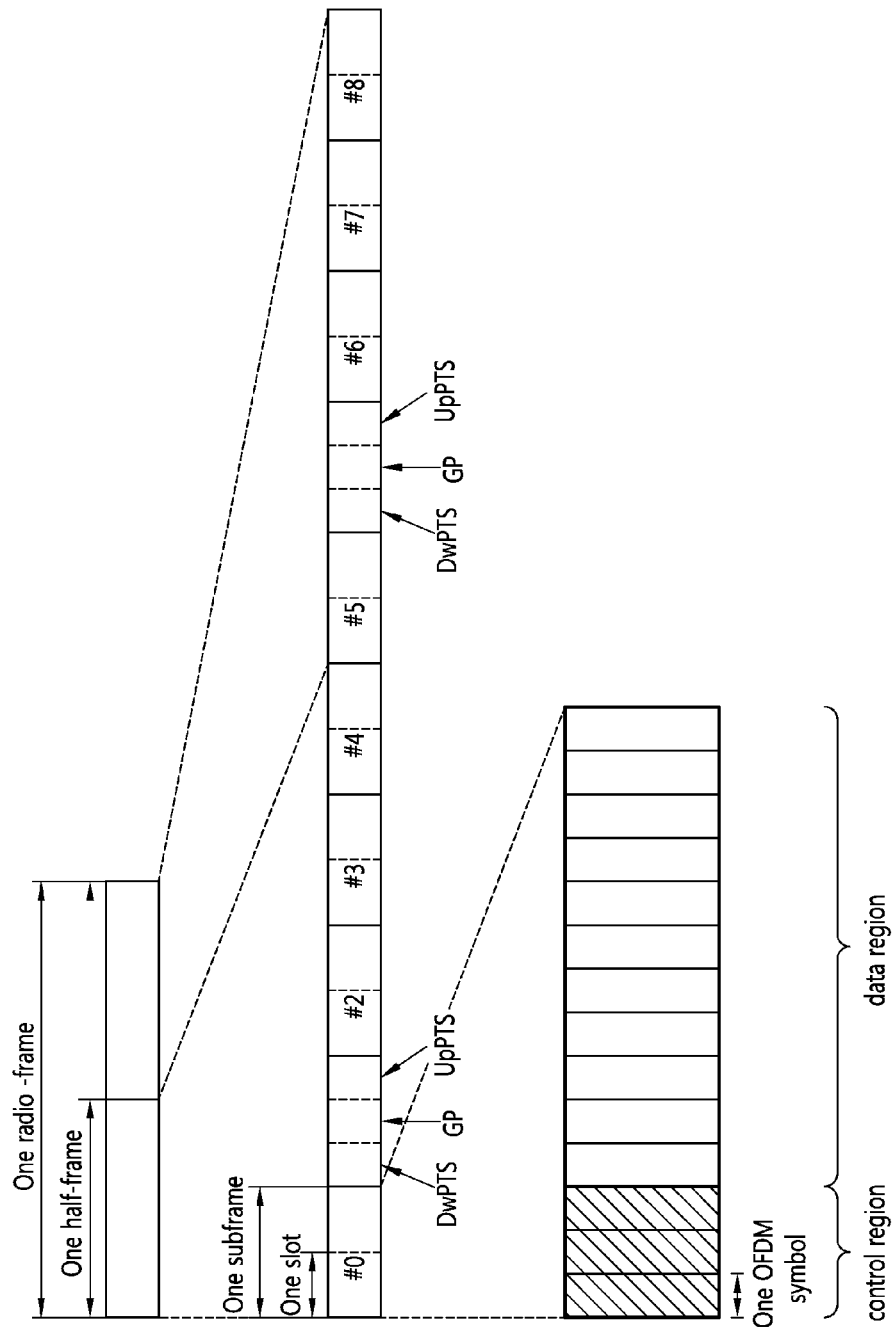
FIG. 5 is a view illustrating a structure of a radio frame in a TDD module, to which the present invention is applied.

FIG. 5 shows a downlink radio frame structure in TDD mode.

Referring to FIG. 5, a subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and downlink.

In TDD, a downlink (DL) subframe and an uplink (UL) subframe co-exist in one radio frame. Table 1 shows an example of a configuration of the radio frame.

TABLE 1

| Uplink-downlink configuration | Switch-point periodicity | \multicolumn{10}{c}{Subframe number} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL (downlink) is divided into a control region and a data region in a time domain. The control region includes a maximum of first three OFDM symbols of a first slot in a subframe, but the number of OFDM symbols included in the control region may be changed. A PDCCH and other control channel are allocated to the control region, and a PDSCH is allocated to the data region.

Figure 6:
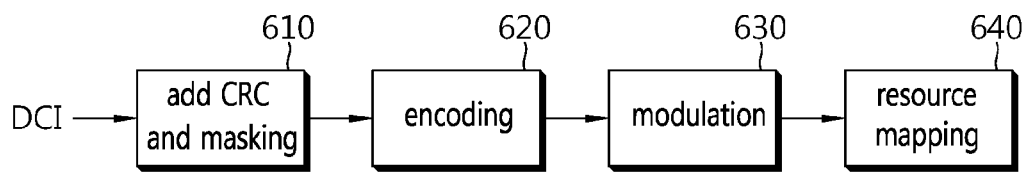
FIG. 6 is a block diagram illustrating a method of generating PDCCH data, to which the present invention is applied.

FIG. 6 is a block diagram showing a method for generating the PDCCH data. FIG. 6 introduces a method for generating the PDCCH data in detail.

Refer to FIG. 6, a wireless device performs blind decoding for PDCCH detection. The blind decoding may be performed based on an identifier which is masked from a cyclic redundancy check (CRC) of a received PDCCH (referred to as a candidate PDCCH). The wireless device may determine whether the received PDCCH data are its own control data by performing CRC error checking on the received PDCCH data.

A BS determines a PDCCH format according to a downlink control information (DCI) to be transmitted to a wireless device, attaches a cyclic redundancy check (CRC) to the DCI, and masks a unique identifier (referred to as a radio network temporary identifier (RNTI)) to the CRC according to an owner or usage of the PDCCH (block 610).

If the PDCCH is for a specific wireless device, the BS may mask a unique identifier of the wireless device, e.g., cell-RNTI (C-RNTI) to the CRC. Alternatively, if the PDCCH is for a paging message, the BS may mask a paging indication identifier, e.g., paging-RNTI (P-RNTI) to the CRC. If the PDCCH is for system information, the BS may mask a system information identifier, e.g., system information-RNTI (SI-RNTI) to the CRC. In addition, in order to indicate a random access response that is a response for transmission of a random access preamble, the BS may mask a random access-RNTI (RA-RNTI) to the CRC, and in order to indicate a transmit power control (TPC) command for a plurality of wireless devices, the BS may mask a TPC-RNTI to the CRC.

The PDCCH which is masked by the C-RNTI carries control information for a specific wireless device (such information is called UE-specific control information), and the PDCCH masked by other RNTIs may carry common control information received by all or a plurality of wireless devices in a cell. A plurality of DCI formats can be defined to transmit the PDCCH data. This will be additionally described below.

The BS generates coded data by encoding the CRC-attached DCI (block 620). The encoding includes channel encoding and rate matching.

The BS generates modulation symbols by modulating the coded data (block 630).

The BS maps the coded data to physical resource elements (REs) (block 640). The BS may map the modulation symbols to each resource element (RE).

As described above, the control region in a subframe includes a plurality of control channel elements (CCEs). The CCE is a logical allocation basis used for providing the PDCCH with a coding rate depending on a radio channel state, and corresponds to a plurality of resource element groups (REGs). The REG includes a plurality of resource elements. One REG includes four Res, and one CCE includes nine REGs. In order to configure one PDCCH, 1, 2, 4 or 8 CCEs may be used, and the CCE aggregated as a basis of 1, 2, 4 or 8 is referred to as a CCE aggregation level.

The BS determines the number of CCEs used in transmission of the PDCCH according to a channel state. For example, a wireless device having a good downlink channel state may use one CCE in PDCCH transmission. On the other hand, a wireless device having a poor downlink channel state may use 8 CCEs in PDCCH transmission.

A control channel consisting of one or more CCEs performs interleaving on an REG basis, and may be mapped to a physical resource after performing cyclic shift based on a cell identifier (ID).

Figure 7:
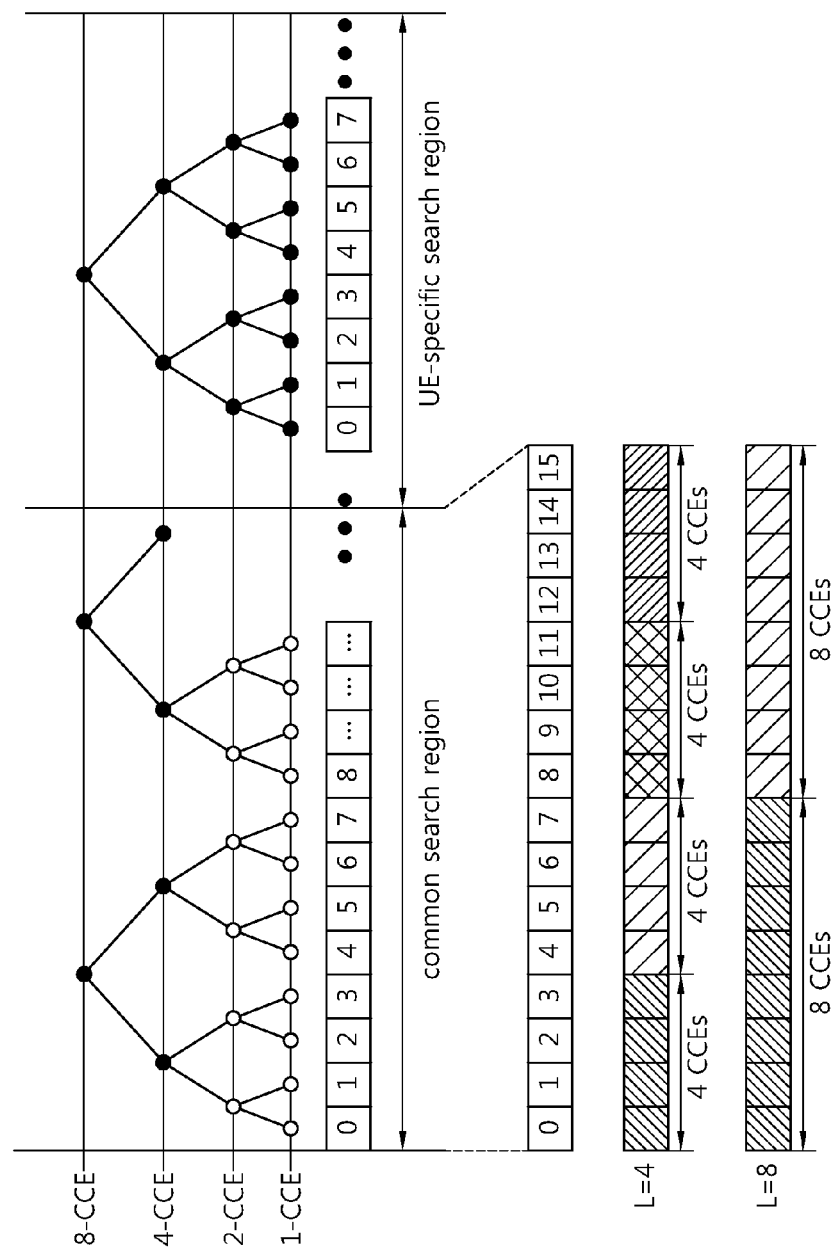
FIG. 7 is a view illustrating monitoring of a PDCCH, to which the present invention is applied.

FIG. 7 is a view illustrating an example of monitoring PDCCH.

Referring to FIG. 7, an UE can perform blind decoding for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of CCE aggregation level or DCI format for transmission and a position at which its PDCCH data is transmitted in a control region.

A plurality of PDCCHs may be transmitted in one subframe. The UE monitors a plurality of PDCCHs at every sub-frame. Here, the term "monitoring" refers to the UE attempting to perform blind decoding on a PDCCH.

In 3GPP LTE, the UE uses a search space (SS) for reducing load caused by blind decoding. The search space may be regarded as CCEs' monitoring set for searching a PDCCH. The UE monitors the PDCCH based on the search space.

The search space is divided into a common search space (CSS) and a UE-specific search space (USS). The common search space is a space for searching a PDCCH having common control information and consists of 16 CCEs, CCE index 0 to 15, and supports PDCCHs having a CCE aggregation level of $\{4, 8\}$. However, a PDCCH (DCI formats 0 and 1A) for carrying UE-specific information may be transmitted even in the common search space. The UE-specific search space supports PDCCHs having a CCE aggregation level of $\{1, 2, 4, 8\}$.

The following table 2 shows the number of PDCCH candidates that are monitored by the UE.

TABLE 2

| | Search space $S_L^{(L)}$ | | Number of | |
|---|---|---|---|---|
| Type | Aggregation level L | Size [in CCEs] | PDCCH candidates $M^{(L)}$ | DCI Format |
| UE-specific | 1 | 6 | 6 | 0, 1, 1A, |
| | 2 | 12 | 6 | 1B, 1D, 2, |

TABLE 2-continued

| Type | Search space $S_k^{(L)}$ | | Number of | |
|---|---|---|---|---|
| | Aggregation level L | Size [in CCEs] | PDCCH candidates $M^{(L)}$ | DCI Format |
| | 4 | 8 | 2 | 2A |
| | 8 | 16 | 2 | |
| Common | 4 | 16 | 4 | 0, 1A, 1C, |
| | 8 | 16 | 2 | 3/3A |

The size of a search space is determined according to Table 2 above, and the start point of a search space is defined differently for each of the common search space and UE-specific search space. The start point of the common search space is fixed regardless of any sub-frame, but the start point of the UE-specific search space may vary per sub-frame depending on the UE identifier (e.g., C-RNTI), CCE aggregation level and/or slot number in a radio frame. In case the start point of the UE-specific search space is positioned in the common search space, the UE-specific search space and the common search space may overlap.

An aggregation of PDCCH candidates monitored by the UE may be defined on the basis of a search space. In an aggregation level 1, 2, 4 or 8, search space $S_k^{(L)}$ is defined as a set of PDCCH candidates. The CCE corresponding to PDCCH candidate m in search space $S_k^{(L)}$ is given as follows:

$$L\;\{(Y_k+m')\bmod\lfloor N_{CCE,k}/L\rfloor\}+i \qquad \text{Equation 1}$$

Here, i=0, . . . L−1, and in case the search space is the common search space, m'=m. In case the search space is a specific search space, and a carrier indicator field (CIF) is configured to the UE, m'=m+$M^{(L)} \cdot n_{CI}$, $n_{CI}$ is a value of the configured CIF. If the CIF is not configured to the UE, m'=m. Here, it is m=0, . . . , $M^{(L)}$−1 and $M^{(L)}$ is the number of the PDCCH candidates for monitoring the given search space.

In the common search space, Yk is set as 0 for two aggregation levels, L=4 and L=8. In the UE-specific search space of aggregation level L, variable Yk is defined as follows:

$$Y_k=(A \cdot Y_{k-1})\bmod D \qquad \text{Equation 2}$$

Here, $Y_{-1}=n_{RNTI}\neq 0$, A=39827, D=65537, k=$\lfloor n_s/2 \rfloor$, and $n_s$ is a slot number in a radio frame.

When a wireless device monitors the PDCCH based on the C-RNTI, a DCI format, and a search space are determined according to a PDSCH transmission mode. Table 12 below shows an example of monitoring PDCCH in which the C-RNTI is configured.

TABLE 3

| Transmission mode | DCI format | Search Space | Transmission mode of PDSCH corresponding to PDCCH |
|---|---|---|---|
| Mode 1 | DCI format 1A | Common and UE specific | Single-antenna port, port 0 |
| | DCI format 1 | UE specific | Single-antenna port, port 0 |
| Mode 2 | DCI format 1A | Common and UE specific | Transmit diversity |
| | DCI format 1 | UE specific | Transmit diversity |

TABLE 3-continued

| Transmission mode | DCI format | Search Space | Transmission mode of PDSCH corresponding to PDCCH |
|---|---|---|---|
| Mode 3 | DCI format 1A | Common and UE specific | Transmit diversity |
| | DCI format 2A | UE specific | Cyclic Delay Diversity(CDD) or Transmit diversity |
| Mode 4 | DCI format 1A | Common and UE specific | Transmit diversity |
| | DCI format 2 | UE specific | Closed-loop spatial multiplexing |
| Mode 5 | DCI format 1A | Common and UE specific | Transmit diversity |
| | DCI format 1D | UE specific | Multi-user Multiple Input Multiple Output(MU-MIMO) |
| Mode 6 | DCI format 1A | Common and UE specific | Transmit diversity |
| | DCI format 1B | UE specific | Closed-loop spatial multiplexing |
| Mode 7 | DCI format 1A | Common and UE specific | If the number of PBCH transmit ports is one, single-antenna port, port 0 is used, otherwise Transmit diversity |
| | DCI format 1 | UE specific | Single-antenna port, port 5 |
| Mode 8 | DCI format 1A | Common and UE specific | If the number of PBCH transmit ports is one, single-antenna port, port 0 is used, otherwise Transmit diversity |
| | DCI format 2B | UE specific | Dual layer transmit, port 7 or 8 or single-antenna port, port 7 or 8 |

Uses of DCI formats can be classified as shown in the following table.

TABLE 4

| DCI format | Description |
|---|---|
| DCI format 0 | used for the scheduling of PUSCH |
| DCI format 1 | used for the scheduling of PDSCH codeword |
| DCI format 1A | used for the compact scheduling of one PDSCH codeword and random access procedure |
| DCI format 1B | used for the compact scheduling of one PDSCH codeword with precoding information |
| DCI format 1C | used for the compact scheduling of one PDSCH codeword |
| DCI format 1D | used for the compact scheduling of one PDSCH codeword with precoding and power offset information |
| DCI format 2 | used for the scheduling PDSCH to UEs configured in closed-loop spatial multiplexing mode |
| DCI format 2A | used for the scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustment |

DCI formats and search spaces to be used may be differently determined depending on RNTI masked to CRC which has been used for generating DCI. Table 14 below represents DCI formats and search spaces of a control channel in case that SI-RNTI, P-RNTI or RA-RNTI is masked to the CRC of the DCI.

TABLE 5

| DCI format | Search space | Transmission mode of PDSCH corresponding to PDCCH |
|---|---|---|
| DCI format 1C | Common | If the number of PBCH transmit ports is one, single-antenna port, port 0 is used, otherwise Transmit diversity |
| DCI format 1A | Common | If the number of PBCH transmit ports is one, single-antenna port, port 0 is used, otherwise Transmit diversity |

Table 6 below shows DCI formats and search spaces of a control channel in case that SPS-C-RNT is masked to the CRC of the DCI

TABLE 6

| Transmission mode | DCI format | Search space | Transmission mode of PDSCH corresponding to PDCCH |
|---|---|---|---|
| Mode 1 | DCI format 1A | Common and UE specific | Single antenna port, port 0 |
|  | DCI format 1 | UE specific | Single antenna port, port 0 |
| Mode 2 | DCI format 1A | Common and UE specific | Transmit diversity |
|  | DCI format 1 | UE specific | Transmit diversity |
| Mode 3 | DCI format 1A | Common and UE specific | Transmit diversity |
|  | DCI format 2A | UE specific | Transmit diversity |
| Mode 4 | DCI format 1A | Common and UE specific | Transmit diversity |
|  | DCI format 2 | UE specific | Transmit diversity |
| Mode 5 | DCI format 1A | Common and UE specific | Transmit diversity |
| Mode 6 | DCI format 1A | Common and UE specific | Transmit diversity |
| Mode 7 | DCI format 1A | Common and UE specific | Single antenna port 5 |
|  | DCI format 1 | UE specific | Single antenna port 5 |
| Mode 8 | DCI format 1A | Common and UE specific | Single antenna port 7 |
|  | DCI format 2B | UE specific | Single antenna port 7 or 8 |
| Mode 9 | DCI format 1A | Common and UE specific | Single antenna port 7 |
|  | DCI format 2C | UE specific | Single antenna port 7 or 8 |
| Mode 10 | DCI format 1A | Common and UE specific | Single antenna port 7 |
|  | DCI format 2D | UE specific | Single antenna port 7 or 8 |

Table 7 below shows search spaces and DCI formats used in case that temporary C-RNTI is masked to the CRC of the DCI.

TABLE 7

| DCI format | Search space | Transmission mode of PDSCH corresponding to PDCCH |
|---|---|---|
| DCI format 1A | Common and UE specific | If the number of PBCH transmit ports is one, single-antenna port, port 0 is used, otherwise Transmit diversity |
| DCI format 1 | Common and UE specific | If the number of PBCH transmit ports is one, single-antenna port, port 0 is used, otherwise Transmit diversity |

Figure 8:
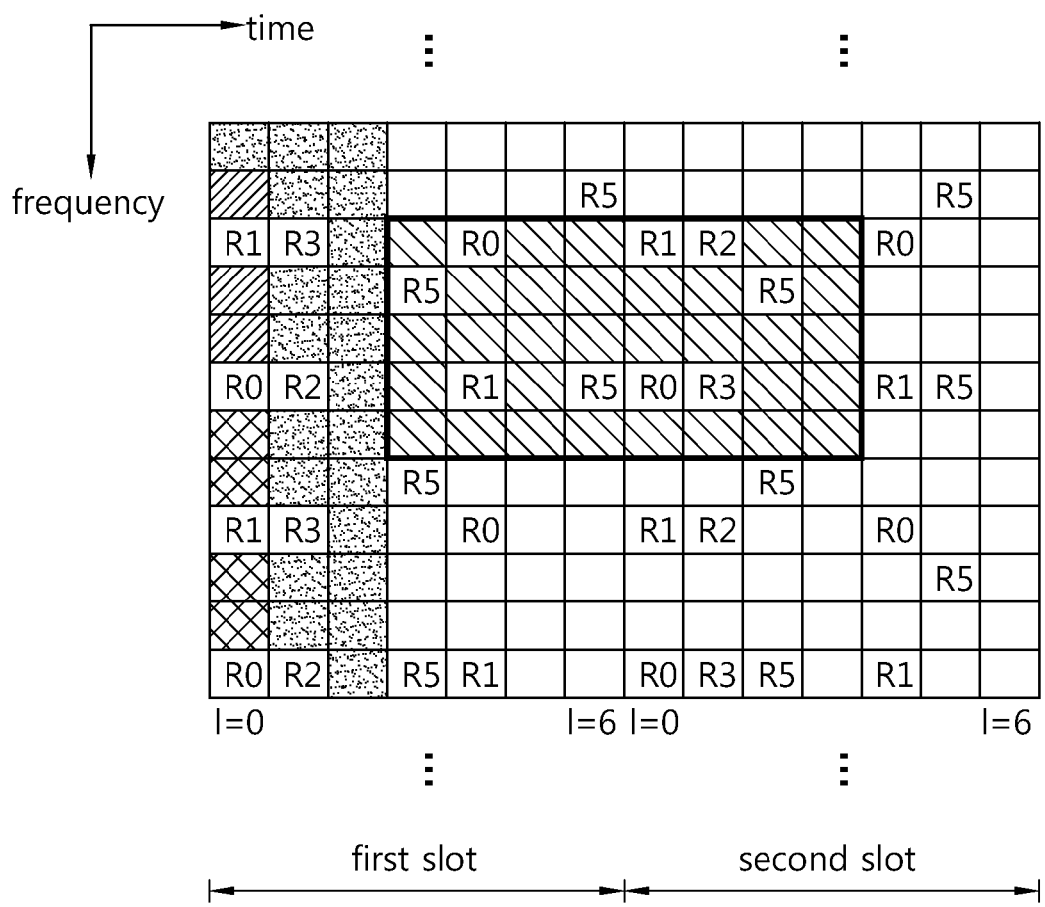
FIG. 8 is a view illustrating a downlink subframe to which a reference signal and a control channel are allocated, to which the present invention is applied.

FIG. 8 shows an example of a downlink subframe in which a reference signal and a control channel in a wireless communication system to which the present invention is applied.

Refer to FIG. 8, a downlink subframe may be classified into a control region and a data region. For example, in the downlink subframe, the control region (or a PDCCH region) includes front three OFDM symbols and the data region in which a PDSCH is transmitted includes remaining OFDM symbols.

In the control region, a PCFICH, a PHICH and/or the PDCCH are transmitted. The physical HARQ ACK/NACK indicator channel (PHICH) may transmit a hybrid automatic retransmission request (HARQ) information as a response to a uplink transmission. The physical control format indicator channel (PCFICH) may transmit the information of the number of OFDM symbols allocated to the PDCCH. For example, a control format indicator (CFI) of the PCFICH may indicate three OFDM symbols. The region excluding the resource through which the PCFICH and/or the PHICH is transmitted is the PDCCH region that a wireless device monitors the PDCCH.

In the subframe, various reference signals may be transmitted as well. A cell-specific reference signal reference signal (CRS) is a reference signal that all wireless devices in a cell may receive, and may be transmitted over the whole downlink frequency band. In FIG. 8, R0 denotes an RE (resource element) where a CRS for a first antenna port is transmitted, R1 which is an RE where a CRS for a second antenna port is transmitted, R2 which is an RE where a CRS for a third antenna port is transmitted, and R3 which is an RE where a CRS for a fourth antenna port is transmitted. The RS sequence $r_{l,n_s}(m)$ for CRS is defined as follows.

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \langle \text{Equation 3} \rangle$$

Herein, m=0, 1, . . . , $2N_{RB}^{max,DL}-1$, $N_{RB}^{max,DL}$ is the maximum number of RBs, ns is a slot number in a radio frame, and 1 is an OFDM symbol index in a slot.

A pseudo-random sequence, c(i), is defined by a gold sequence whose length is 31, as follows.

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{<Equation 4>}$$

Herein, Nc=1600, and the first m-sequence is initialized as x1(0)=1, x1(n)=0, m=1, 2, . . . , 30. The second m-sequence is initialized as $c_{init}=2^{10} \cdot (7 \cdot (n_s+1)+l+1) \cdot (2 \cdot N_{ID}^{cell}+1)+2 \cdot N_{ID}^{cell}+N_{CP}$ at the beginning of each OFDM symbol. $N_{ID}^{cell}$ is a physical cell identity (PCI) of the cell, and $N_{CP}=1$ in case of the normal CP, and $N_{CP}=0$ in case of the extended CP.

Also, a UE-specific reference signal (URS) may be transmitted in a subframe. Although the CRS is transmitted in the entire region of a subframe, the URS is transmitted in the data region of the sub-frame, and is a reference signal used for demodulating the PDSCH. In FIG. 8, R5 denotes an RE where the URS is transmitted. A DM-RS is a reference signal used for demodulating the EPDCCH data.

The URS may be transmitted in an RB in which the corresponding PDSCH data is mapped. Although in FIG. 8, R5 is denoted outside the area in which the PDSCH is transmitted, this is merely to indicate the position of the RE to which the URS is mapped.

The URS is may be a reference signal which is demodulated only by a specific wireless device. The RS sequence $r_{l,n_s}(m)$ for the URS is the same as Equation 3. At this time, m=0, 1, . . . , $12N_{RB}^{PDSCH}-1$ and $N_{RB}^{PDSCH}$ is the number of RBs which is used for the corresponding PDSCH transmission. In case that the URS is transmitted through a single antenna, the pseudo-random sequence generator is initialized as $c_{init}=(\lfloor n_s/2 \rfloor+1) \cdot (2N_{ID}^{cell}+1) \cdot 2^{16}+n_{RNTI}$ at the start of each subframe. $n_{RNTI}$ is an identifier of a wireless device.

The above-described initializing method is associated with the case where the URS is transmitted through a single antenna. When the URS is transmitted through a multi-antenna, the pseudo-random sequence generator is initialized as $c_{init}=(\lfloor n_s/2 \rfloor+1) \cdot (2n_{ID}^{(n_{SCID})}+1) \cdot 2^{16}+n_{SCID}$ at the start of each sub-frame. $n_{SCID}$ is a parameter that is acquired from a DL grant (for example, DCI format 2B or 2C) related with PDSCH transmission.

The URS supports multiple input multiple output (MIMO) transmission. Depending on an antenna port or layer, the RS sequence for the URS may be spread to the spread sequence as follows.

TABLE 8

| Layer | [w(0), w(1), w(2), w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path inputted to a pre coder. A rank is the number of non-zero eigenvalue in the MIMO channel matrix, and is the same as the number of layer or space stream. The layer may correspond to an antenna port that distinguishes the URS and/or a spread sequence which is applied to the URS.

Meanwhile, the PDCCH is monitored in a restricted region such as a control region in a subframe, and the CRS transmitted from whole bands is used for demodulating the PDCCH. As the sort of control data becomes diverse and an amount of the control data is increased, a flexibility of scheduling becomes deteriorated with the existing PDCCH only. Also, in order to decrease overhead owing to the CRS transmission, an enhanced PDCCH (EPDCCH) is introduced.

Figure 9:
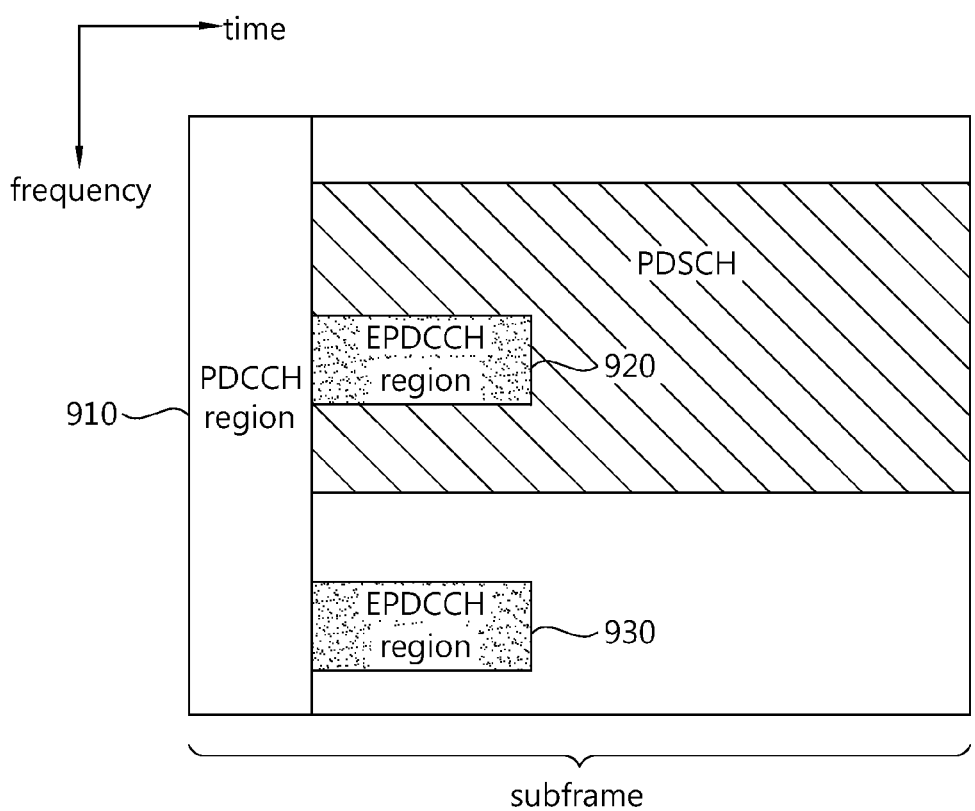
FIG. 9 is a view illustrating an example of a subframe having an EPDCCH, to which the present invention is applied.

FIG. 9 is a view illustrating an exemplary subframe with EPDCCH.

The subframe may include 0 or 1 PDCCH region 910 and 0 or more EPDCCH regions 920 and 930.

The EPDCCH regions 920 and 930 are regions where a UE monitors EPDCCH. The PDCCH region 910 is located in preceding 3 or up to 4 OFDM symbols of a subframe, and The EPDCCH regions 920 and 930 may be flexibly scheduled in the OFDM symbols, following the PDCCH region 910.

One or more EPDCCH regions 920 and 930 may be assigned to the UE. The UE may monitor EPDCCH data in the EPDCCH regions 920 and 930 assigned to the UE.

A base station may notify the UE of information on a subframe for monitoring the EPDCCH and/or the number/position/size of the EPDCCH regions 920 and 930 through a radio resource control (RRC) message, and the like.

In the PDCCH region 910, the PDCCH can be demodulated based on CRS. In the EPDCCH regions 920 and 930, DM-RS may be defined rather than CRS for demodulation. The DM-RS may be transmitted in the corresponding EPDCCH regions 920 and 930.

A RS sequence for the DM-RS is expressed in Equation 3. Here, m=0, 1, . . . , $12N_{RB}^{max,DL}-1$ and $N_{RB}^{max,DL}$ is the maximum number of RBs. A pseudo-random sequence generator can be initialized as $c_{init}=(\lfloor n_s/2 \rfloor+1) \cdot (2n_{ID,i}^{EPDCCH}+1) \cdot 2^{16}+n_{SCID}^{EPDCCH}$ at the start of each sub-frame. ns is the number of a slot in a radio frame, $n_{ID,i}^{EPDCCH}$ is a cell index related to the corresponding EPDCCH region, and $n_{SCID}^{EPDCCH}$ is a parameter given from higher-layer signaling.

Each of the EPDCCH regions 920 and 930 may be used in scheduling for different cells. For example, EPDCCH within the EPCCH region 920 can deliver information on scheduling for a primary cell, and EPDCCH within the EPCCH region 930 can send information on scheduling for a secondary cell.

When the EPDCCH is transmitted via multiple antenna in the EPDCCH regions 920 and 930, the same precoding as that of the EPDCCH may be applied to DM-RS in EPDCCH regions 920 and 930.

Considering that the PDCCH uses CCE as a transmission resource unit, a transmission resource unit for the EPDCCH is referred to as Enhanced Control Channel Element (ECCE), An aggregation level may be defined as a resource unit for monitoring the EPDCCH. For example, assuming that 1 ECCE is a minimum resource for the EPDCCH, an aggregation level may be L={1, 2, 4, 8, 16}. A search space may be defined even in the EPDCCH region. The UE can monitor EPDCCH candidates on the basis of the aggregation level.

Figure 10:
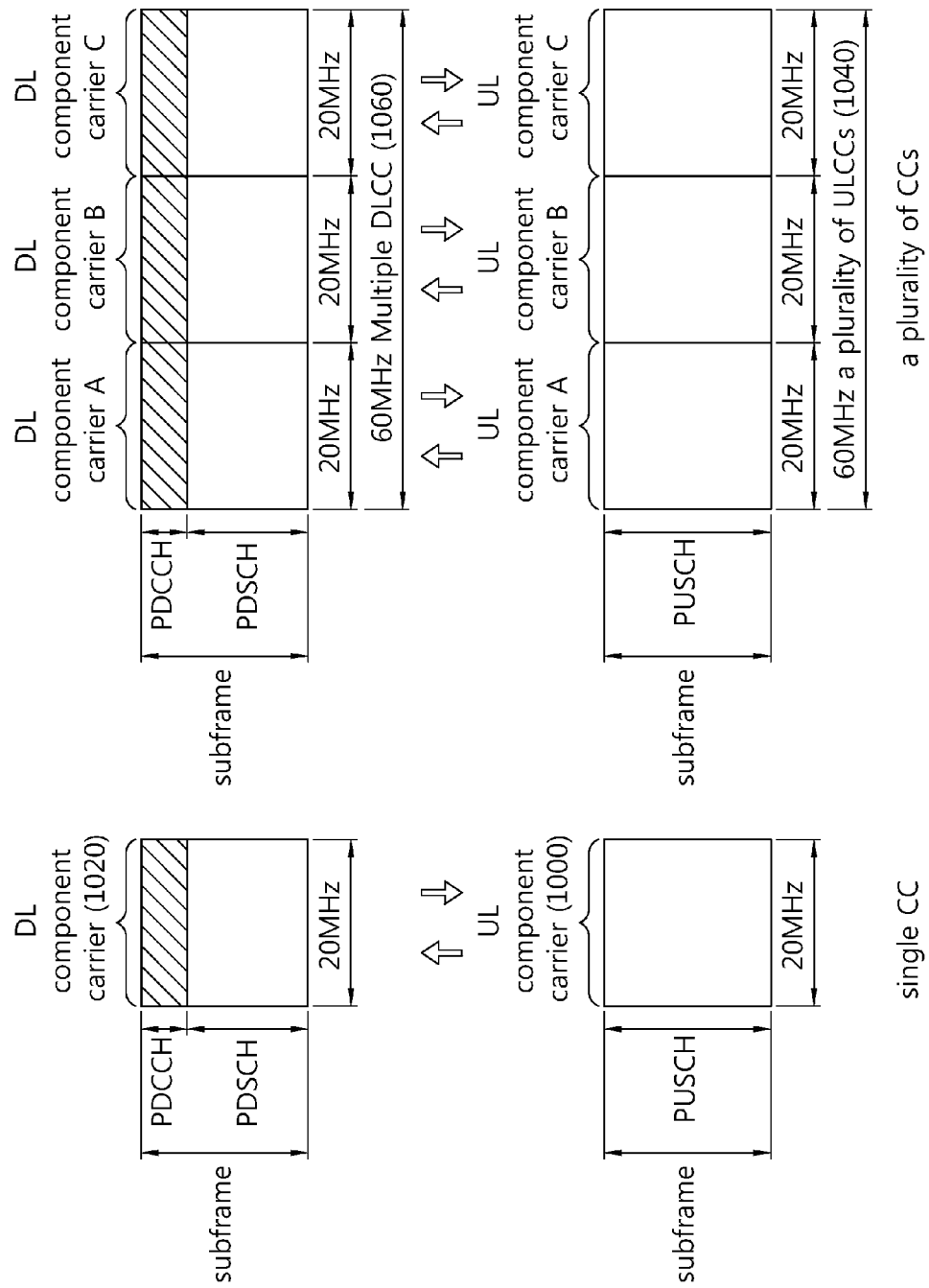
FIG. 10 is a conceptual view illustrating carrier aggregation (CA) to which the present invention is applied.

FIG. 10 is a conceptual diagram showing a carrier aggregation.

FIG. 10(A) shows a single component carrier (CC). A single CC may correspond to an uplink frequency band 1000 and a downlink frequency band 1020 of 20 MHz. FIG. 10(B) shows multiple CCs. For example, the multiple CC may correspond to an uplink frequency band 1040 and a downlink frequency band 1060 of 60 MHz in which the uplink frequency band and the downlink frequency band of 20 MHz are aggregated.

A BS may transmit data to a wireless device through the plurality of downlink CCs by performing a carrier aggregation. The BS may perform a downlink transmission using N downlink CCs. In this time, if a wireless device may receive downlink data through only M (M is a natural number smaller than or equal to N) downlink CCs, the wireless device may receive the downlink data which are transmitted through only the M downlink CCs from the BS.

Additionally, a BS may set a frequency bandwidth that corresponds to L (L is a natural number smaller than or equal to M and N) downlink CCs as a main CC and operate the frequency bandwidth. The wireless device may preferentially monitor and receive the data that the BS transmits through a main CC. In case of performing the carrier aggregation, a CC may be distinguished according to a cell.

In case of performing the carrier aggregation using the CC of a primary cell (P-cell) and the CC of a secondary cell (S-cell), a carrier that corresponds to the CC of a P-cell among the component carriers used in downlink and uplink is called a primary cell component carrier (PCC) and a carrier that corresponds to the CC of S-cell is called a second cell component carrier (SCC).

Figure 11:
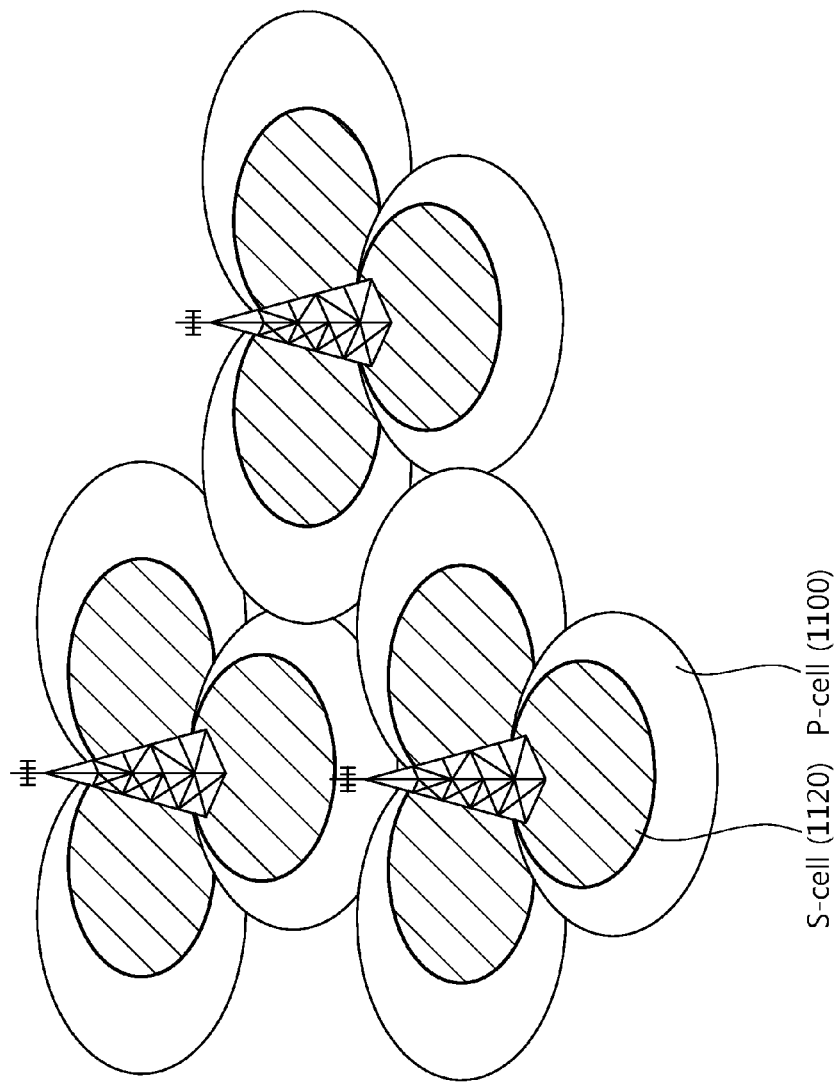
FIG. 11 is a conceptual view illustrating Pcell and Scell, to which the present invention is applied.

FIG. 11 is a conceptual diagram showing the P-cell and the S-cell.

Referring to FIG. 11, a BS may perform a carrier aggregation based on the PCC of a P-cell 1100 and the SCC of one or more S-cell 1120. In case that two or more cells exist, the BS may determine one cell to be the P-cell 1100 and other cells to be S-cell 1020. The BS may aggregate the CCs of the determined P-cell 1100 and the S-cell 1120, and transmit data to a wireless device using an aggregated frequency bandwidth. The wireless device may also transmit data to the BS using the aggregated frequency bandwidth. As an exemplary case among the scenarios in which the P-cell 1100 and the S-cell 1110 are deployed, the P-cell and the S-cell 1120 shown in FIG. 11 shows the case that a transmission range of the data transmitted based on the PCC of the P-cell 1100 is greater than a transmission range of the data transmitted based on the SCC of the S-cell 1120.

The wireless device may perform the radio resource control (RRC) connection through the PCC of the P-cell 1100. Furthermore, the wireless device may attempt to perform a random access to the BS through a physical random access channel (PRACH) based on a signal signaled through the PCC. That is, the wireless device may perform an initial connection establishment process or a connection re-establishment process to the BS through the PCC in the carrier aggregation environment.

The SCC of the S-cell 1120 may be used for providing additional radio resources. In order to perform the carrier aggregation that adds the SCC to the PCC, the wireless device should perform a neighbor cell measurement that the wireless device acquires the information of neighboring cells. Based on the neighbor cell measurement performed by the wireless device, the BS may determine whether to aggregate the SCC into the PCC. For example, a legacy subframe is transmitted through a PCC in a Pcell, and a new subframe (to be described hereinafter) effectively reducing a control channel and reference signals transmitted in the legacy subframe, as well as using the legacy subframe, may be transmitted in an Scell. In a new LTE-A release, a subframe of a new format may be defined to be used. Hereinafter, for the purposes of description, a newly defined subframe different from an existing subframe may be defined as a new carrier (NC) subframe.

That is, in an existing LTE release 8/9/10 system, control channels such as CRS, PSS/SSS, PDCCH, or PBCH, a reference signal, and a synchronization signal may be transmitted in a downlink carrier. A subframe in which such control channels, a reference signal, and a synchronization signal are defined may be called a legacy subframe. In a system after the LTE release 8/9/10 system, a portion of channels or signals transmitted in the existing legacy subframe may not be transmitted to improve interference among a plurality of cells and enhance carrier expandability. A subframe having such characteristics may be defined as an extension carrier subframe or an NC subframe and used. For example, an NC subframe may not include a control channel and/or reference signal information such as PDCCH data and CRS. For example, when a PDCCH does not exist in an NC subframe, control information may be transmitted through an EPDCCH. A PDSCH of an NC subframe may be allocated on the basis of an EPDCCH included in an NC subframe. Thus, a legacy subframe may be a subframe used to be distinguished from a subframe format defined before the 3GPP LTE-A release 11 or a subframe newly defined in the 3GPP LTE-A release 12.

A base station (BS) may transmit PDCCH data to a terminal through a PCC. The PDCCH data may include allocation information regarding PDSCH data transmitted through a downlink PCC band and SCC band and information approving data transmission through uplink. A Pcell 1100 and an Scell 1120 may perform CA through a configuration and activation operation and transmit and receive data through a corresponding frequency band. Here, the Pcell is a carrier activated all the same, and the Scell may operate according to an activation/deactivation instruction from the BS, and the activation/deactivation may be instructed in the form of a MAC message.

Figure 12:
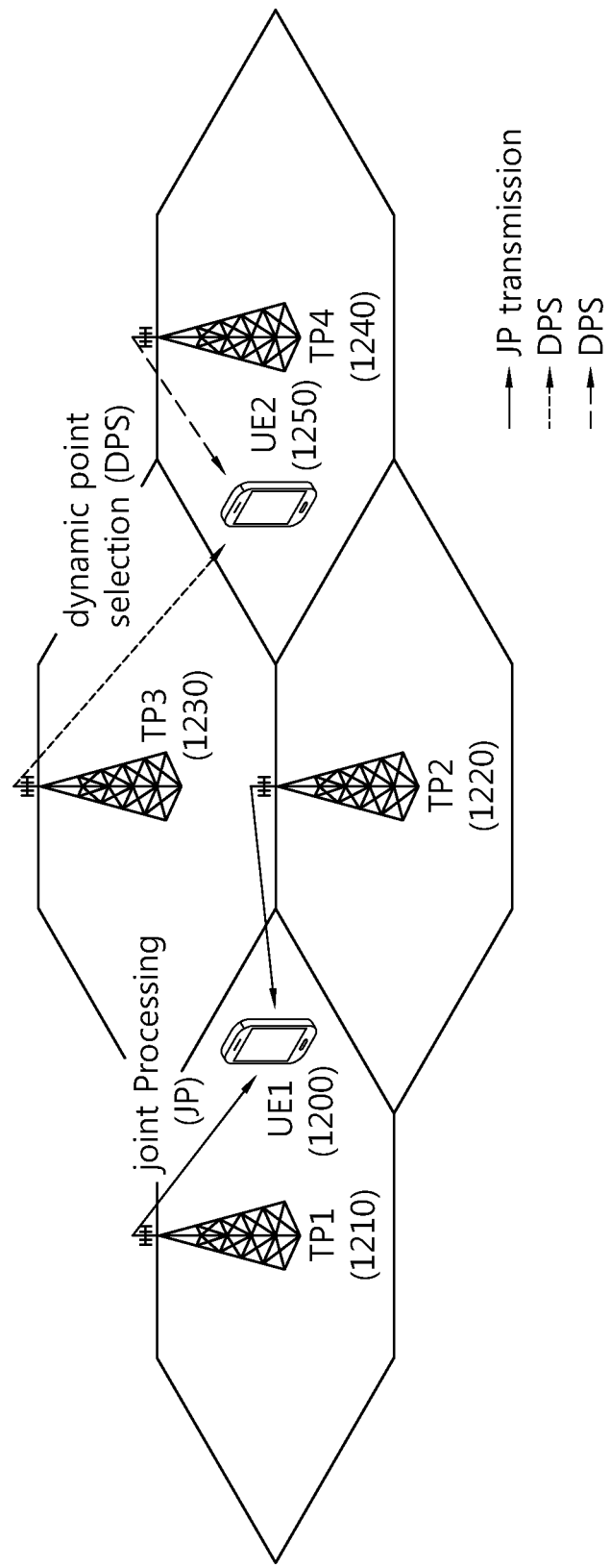
FIG. 12 is a conceptual view illustrating a method of transmitting data on the basis of coordinated multi-point (CoMP), to which the present invention is applied.

FIG. 12 is a conceptual diagram showing a method of transmitting data to a wireless device based on a coordinated multi points (CoMP) in a plurality of transmission points.

Referring FIG. 12, traffic data and control data may be transmitted to a wireless device based on a CoMP at a plurality of transmission points. The plurality of transmission points may generate data which are transmitted to a wireless device within a cell based on a cell ID which is identical or different. The plurality of transmission points may be called a plurality of serving cells or cells in other terminology, and the CoMP may transmit or receive data based on serving cells which are different from each other.

A method is shown that a first transmission point 1210 and a second transmission point 1220 transmit data to a wireless device using a joint transmission (JT) method of the CoMP. In case that the plurality of transmission points 1210 and 1220 transmit data to the wireless device 1200 using the JT method, the same data may be transmitted to the wireless device 1200 from different transmission points 1210 and 1220. The wireless device 1200 may receive and demodulate the data transmitted from different transmission points 1210 and 1220.

A third transmission point 1230 and a fourth transmission point 1240 may transmit data to a wireless device 1250 using a dynamic point selection (DPS) method of the CoMP. In the DPS method, the wireless device may receive data by dynamically selecting a transmission point having a better channel from the transmission points 1230 and 1240 different from each other. For example, when transmitting EPDCCH data to the wireless device 1250 from the third transmission point 1230 on a first time, EPDCCH data may be transmitted to the wireless device 1250 from the fourth transmission point 1240 on a second time.

Figure 13:
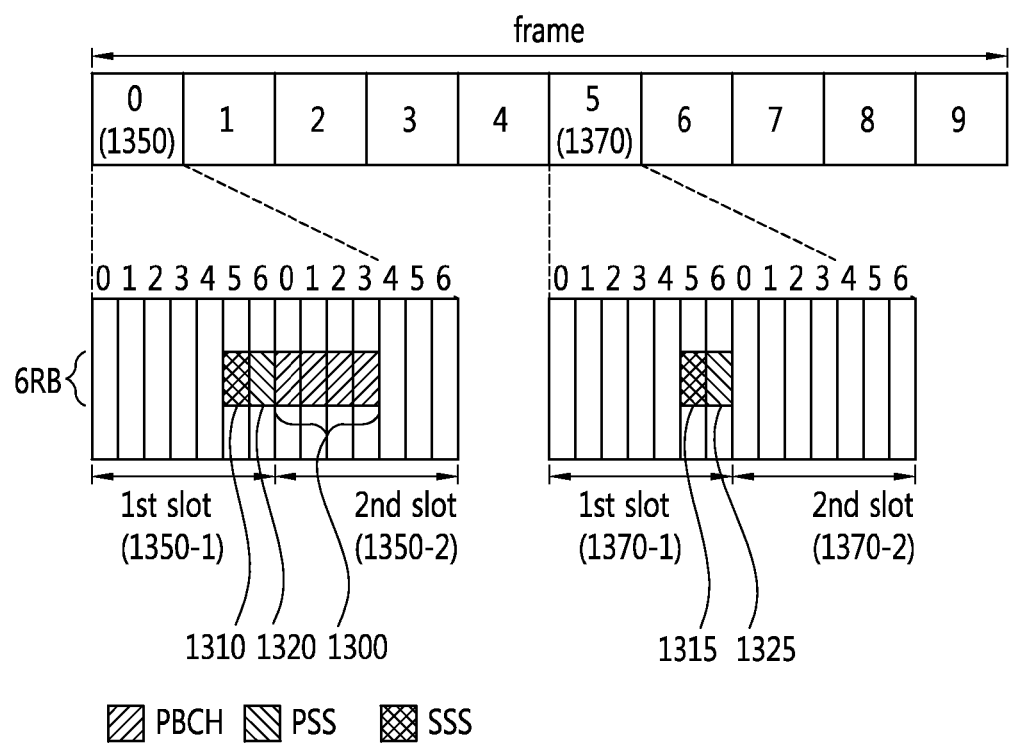
FIG. 13 is a view illustrating transmission of a synchronization signal and PBCH data in a legacy subframe when a frequency division duplex (FDD) is used in a duplex manner, to which the present invention is applied.

FIG. 13 shows a transmission of a synchronization signal and PBCH data in a legacy subframe when Frequency Division Duplexing (FDD) is used in according to a duplexing method.

A physical broadcast channel (PBCH) 1300 is transmitted in former four OFDM symbols in a second slot 1350-2 in the first subframe (i.e., subframe 1350 having an index is 0) of a radio frame. The PBCH 1300 carries system information essential for a wireless device to communicate with a BS, and system information transmitted through the PBCH 1300 is called a master information block (MIB). In contrast, system information transmitted on a PDSCH that is indicated by a PDCCH is called a system information block (SIB).

Seventh OFDM symbols (i.e., OFDM symbol having an index 6), from among OFDM symbols allocated to the first slots 1350-1 and 1370-1 of the first subframe (i.e., subframe 1350 having an index 0) and a seventh subframe (i.e., subframe 1370 having an index 5), may include respective primary synchronization signals (PSSs) 1320 and 1325. The PSSs 1320 and 1325 may be used for acquiring OFDM symbol synchronization or slot synchronization. Furthermore, the information of a physical cell ID may be acquired through the PSSs 1320 and 1325. A primary synchronization code (PSC) is a sequence which is used for generating the PSSs 1320 and 1325. The PSS may be generated by defining a plurality of PSCs in 3GPP LTE. A BS may generate the PSSs 1320 and 1325 using one of 3 PSCs based on a cell ID. A wireless device may acquire the information of the cell ID based on the PSC by receiving the PSSs 1320 and 1325.

Seventh OFDM symbols (i.e., OFDM symbol having an index 6), from among OFDM symbols allocated to the first slots 1350-1 and 1370-1 of the first subframe (i.e., subframe 1350 having an index 0) and a seventh subframe (i.e., subframe 1370 having an index 5), may include secondary synchronization signals (SSSs) 1310 and 1315.

The first SSS 1310 may be transmitted through sixth OFDM symbol in the first slot 1350-1 of the first subframe 1350 and the second SSS 1325 may be transmitted through sixth OFDM symbol in the first slot 1370-1 of the sixth subframe 1370. The SSSs 1310 and 1315 may be used for obtain frame synchronization. The SSSs 1310 and 1315 are used for acquiring information of a cell ID together with the PSSs 1310 and 1315.

The first SSS 1310 and the second SSS 1315 may be generated using different secondary synchronization codes (SSCs). When each of the first SSS 1310 and the second SSS 1315 includes 31 subcarriers, each of the two SSC sequences whose length is 31 is used for the first SSS 1310 and the second SSS 1315.

From a viewpoint of a frequency domain, the PBCH 1300, the PSSs 1310 and 1320, and the SSSs 1315 and 1325 are transmitted within a frequency bandwidth that corresponds to 6 RBs on the basis of a center frequency of the subframe. Meanwhile, a case in which a legacy subframe and an NC subframe are transmitted together in a plurality of transmission points (TP) may be assumed. In this case, information regarding allocation of a PDSCH transmitted through the NC subframe may be included even in a PDCCH included in a legacy subframe. In the NC subframe, downlink control information such as a DCI may be transmitted through an EPDDCH. In the NC subframe, a CRS is not transmitted, and thus, the DCI may be demodulated on the basis of a reference signal such as a DM-RS. The NC subframe may be NC subframe even when configuration of the NC subframe and a legacy subframe are configured in a time division multiplexing (TDM) manner in a single subframe. For example, even when one slot is generated as configuration of a channel and a signal of an NC subframe and the other one slot is generated as configuration of a channel and a signal of a legacy subframe, the corresponding subframe may be considered an NC subframe. Also, the NC subframe and the legacy subframe may be divided on the basis of a time within a single frame in a TDM manner and transmitted. For example, a frame transmitted in a single cell may include both an NC subframe and a legacy subframe, which may be considered an NC frame.

On the assumption of a Pcell transmitting data on the basis of a legacy subframe and an Scell transmitting data using an NC subframe, data may be transmitted to a terminal on the basis of the Pcell and the Scell. That is, the NC subframe may be a subframe transmitting in an SCC, a frequency band allocated to the Scell. When data is transmitted to a terminal on the basis of the Pcell and the Scell, a BS may inform the Scell about a position of an OFDM symbol in which a PDSCH starts in a legacy subframe through higher layer signaling. A parameter informing about the position of the OFDM symbol in which PDSCH starts in the legacy subframe may have values from 1 to 4.

An NC frame including NC subframes may include ten NC subframes. The NC frame may transmit a reference signal performing time/frequency tracking only in a particular subframe, rather than in every subframe included in the frame. The reference signal performing time/frequency tracking, included in the NC subframe and transmitted may be a tracking reference signal (TRS). Instead of the TRS, a term of enhanced synchronization signal (eSS) or a reduced CRS may be used to express the reference signal performing time/frequency tracking, included in the NC subframe and transmitted. The TRS may be transmitted in a particular subframe (for example, subframe 0 to subframe 5) of the single NC frame. The TRS may be a reference signal defined to be transmitted in a particular RER of a particular RB of the NC subframe. Alternatively, an RS having a new form or an added DM-RS for a synchronization signal (discovery channels) may be used in the NC subframe.

In the NC subframe, PDSCH data may not be mapped to a TRS-configured RE and transmitted. That is, in the NC subframe, data rate matching may be performed on PDSCH data in consideration of a TRS-configured RE. Another NC subframe may be a subframe in the form in which the TRS-configured RE is punctured.

An antenna port for transmitting the TRS may be defined as an antenna port x. When the BS transmits the TRS on the basis of the antenna port x, the BS may not map data of PDSCH or EPDCCH in an RE corresponding to the antenna port x transmitting the TRS.

An initial value of a pseudo-random sequence used to generate the TRS may be determined on the basis of $c_{init}=2^{10} \cdot (7 \cdot (n_s+1)+l+1) \cdot (2 \cdot N_{ID}^{cell}+1)+2 \cdot N_{ID}^{cell}+N_{CP}$. Here, $n_s$ denotes a slot number, l denotes the number of an OFDM symbol, $N_{ID}^{cell}$ denotes a cell identifier, and $N_{CP}$ denotes a length of a CP. $N_{CP}$ may have different values according to types of the CP.

As a parameter for reducing an influence of inter-cell interference, v-shift may be used. V-shift may be used as a parameter for adjusting a position of the RE to which the TRS is mapped. For example, v-shift may be determined on the basis of $v_{shift}=N_{ID}^{cell} \mod 6$. V-shift may be a fixed value such as 0.

Figure 14:
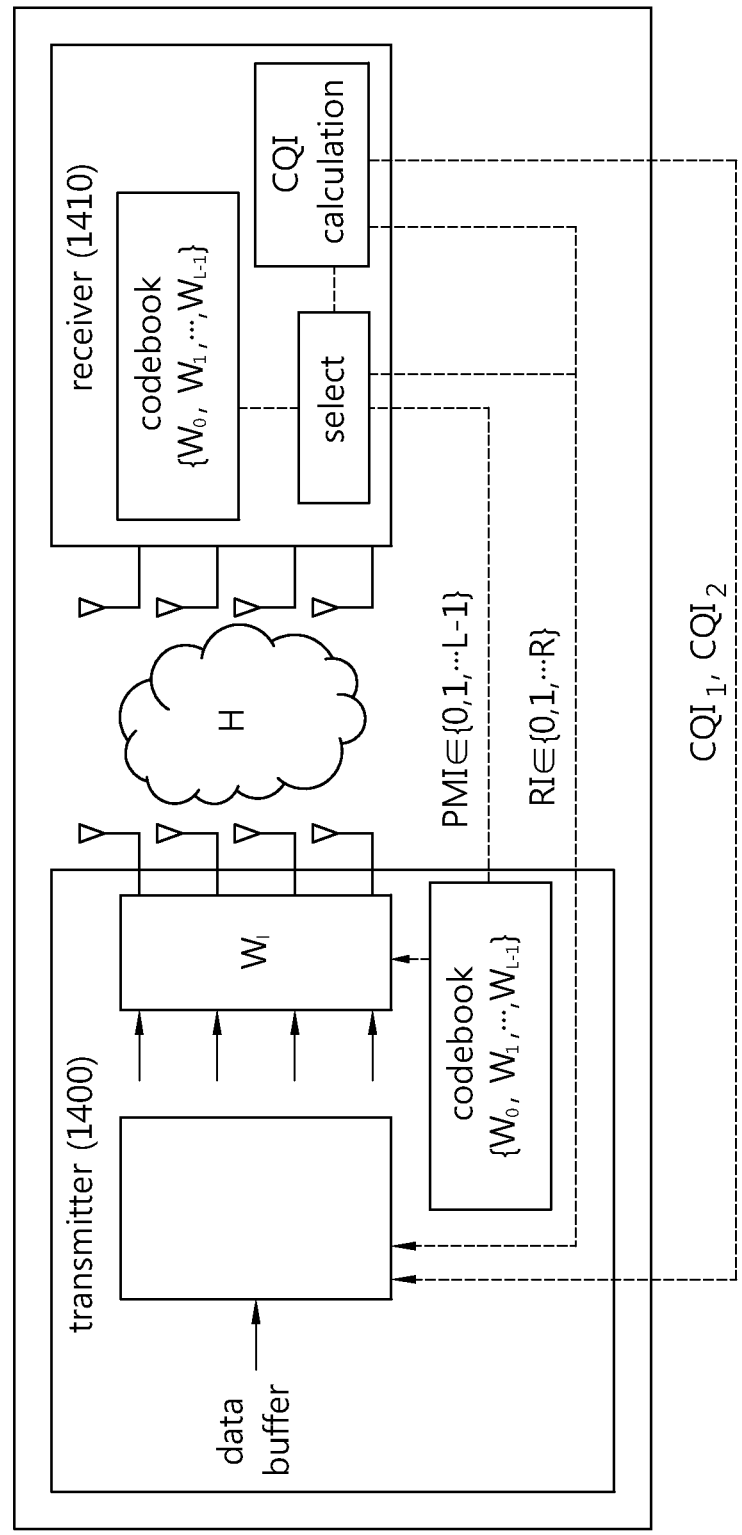
FIG. 14 is a conceptual view illustrating transmission of a CSI-RS and feedback of CSI measured in a terminal, to which the present invention is applied.

FIG. 14 is a concept view illustrating transmission of a CSI-RS and a CSI feedback measured by a terminal to which the present invention is applied.

Referring to FIG. 14, the terminal 1410 may feed back to the base station 1400 channel information produced based on a CSI-RS transmitted from the base station 1400 using parameters such as an RI (rank index), a PMI (precoding matrix index), or a CQI (channel quality indicator). The parameters indicating channel information, such as an RI, a PMI, or a CQI, may be denoted CSI (channel state information) feedback information. Each type of CSI feedback information may play a role as follows:

(1) RI (rank index) may contain information on a transmission rank. In other words, information on the number of layers used for downlink transmission may be provided to the base station based on the RI.

(2) PMI (precoding matrix index) may contain information on a precoding matrix used for downlink transmission.

(3) CQI (channel-quality indication) may contain information on an MCS (modulation and coding scheme).

The terminal 1410 may report information on the downlink channel state by transmitting the RI, PMI, CQI or other information indicating the channel state, as the feedback information for the CSI-RS transmitted from the base station 1400.

The CRS is also a reference signal that may be used for the terminal to obtain downlink channel state information. Accordingly, the CRS may overlap, in role, the CSI-RS. The CSI-RS may be used to supplement the CRS, an existing reference signal. As the number of transmit antennas increases, the CSI-RS may be used to determine better the channel state information than the existing reference signal, CRS. The existing CRS density was set high in order to enable channel measurement in the very quickly varying channel environment. Accordingly, the CRS operates as a high overhead.

In contrast, the CSI-RS is a reference signal used only to obtain CSI, and thus, the CSI-RS has low time-frequency density. Accordingly, the CSI-RS has a lower overhead than the CRS. Therefore, as a new type of reference signal, rather than extensions to the existing reference signal, CRS, the CSI-RS having low time-frequency density and low overhead may be defined and used.

One cell or base station may include one, two, four, or eight CSI-RSs for each resource block pair, and may transmit the same to the terminal. A CSI-RS configuration is a deployment of CSI-RSs in a resource grind, and there may be different CSI-RS configurations depending on the number of CSI-RSs used in one cell.

Figure 15:
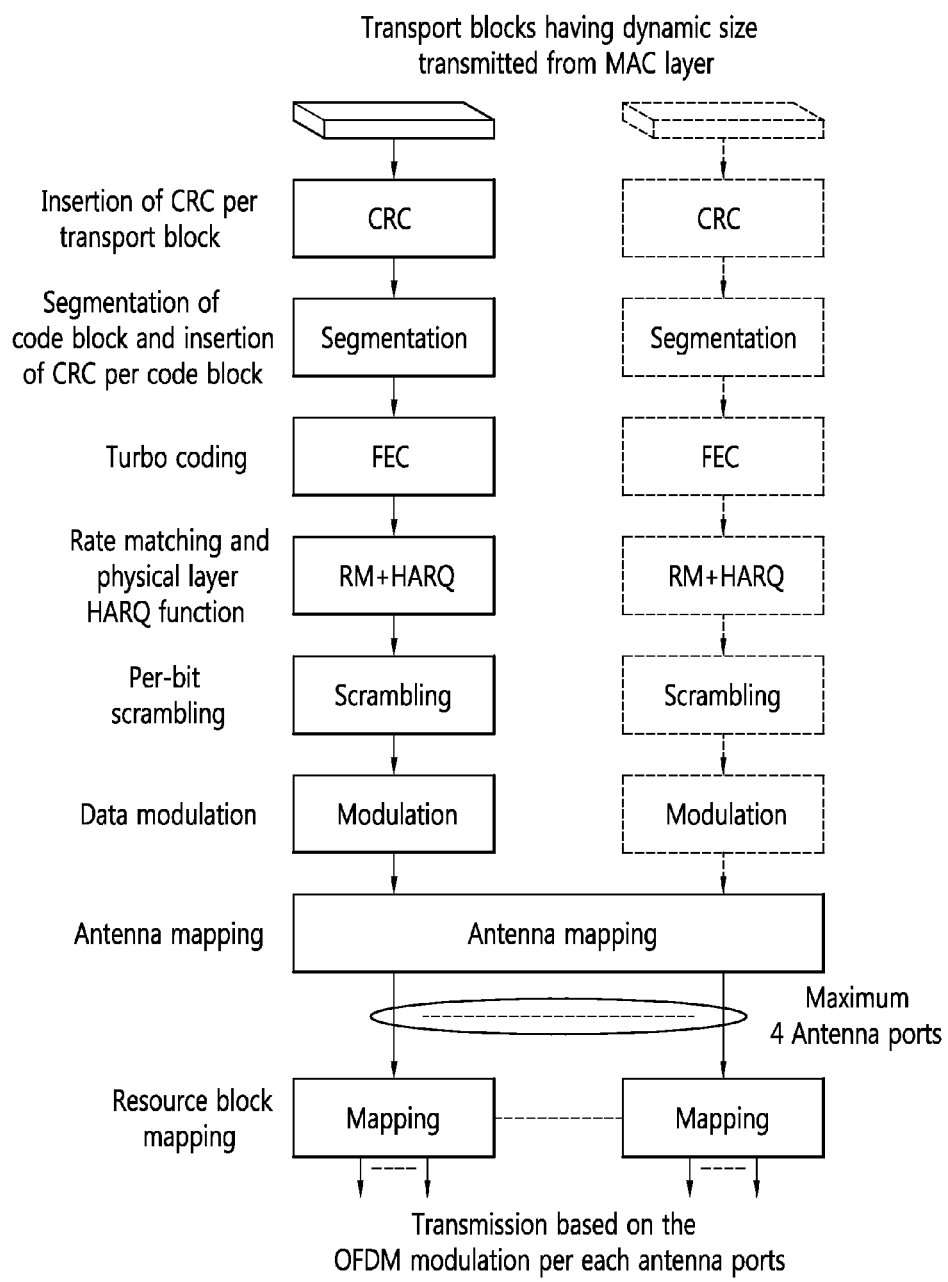
FIG. 15 is a conceptual view illustrating a method of processing a downlink transport channel, to which the present invention is applied.

FIG. 15 is a concept view illustrating a downlink transport channel processing method to which the present invention is applied. FIG. 15 illustrates an operation in which a transport block is transmitted via a transport channel to a physical layer.

Referring to FIG. 15, an LTE physical layer interfaces with its higher layer, an MAC layer, by way of a transport channel. In the case of single antenna transmission, there is a dynamically-sized transport block per TTI (transmission time interval). For example, in the case of multi-antenna transmission, there may be multiple (e.g., two) dynamically-sized transport blocks per TTI.

FIG. 15 illustrates a processing procedure for DL-SCH transmission in conducting an LTE downlink transmission process. The second processing procedure corresponding to the second transport block is provided only in the case of downlink spatial multiplexing. In the case of spatial multiplexing, two different-size transport blocks may be typically combined with each other through antenna mapping. The LTE downlink transport channel processing method illustrated in FIG. 15 is now described.

(1) Insertion of CRC Per Transport Block

At the first step of the transport channel processing, a 24-bit CRC may be computed and the same may be added to each transport block. Errors in the decoded transport blocks may be detected at the reception end through the CRC. For example, a downlink HARQ protocol may be used to inform the detected errors and to request re-transmission.

(2) Segmentation of Code Block and Insertion of CRC Per Code Block

The interleaver in the LTE turbo code may be restricted as per size, and the same may be defined only for a limited size of code blocks having a specific bit in the maximum block size. In case the size of the CRC-added transport block is more than the maximum code block size, code block segmentation may be conducted before turbo coding is conducted. The code block segmentation refers to dividing the transport block into smaller code blocks that fit the code block size defined in the turbo code.

(3) Turbo Coding

In LTE systems, the WCDMA/HSPA turbo encoder internal interleaver has been replaced with QPP (quadrature permutation polynomial)-based interleaving. Contrary to the WCDMA/HSPA turbo code interleaver, the QPP-based interleaver is a maximally contention-free interleaver, and thus, the QPP-based interleaver may enable simple parallelization of a decoding process without collision even when different parallel processes approach the interleaver memory.

(4) Rate Matching and Physical Layer HARQ Function.

Rate matching and physical layer HARQ are for correct selection of bits to be transmitted within a given TTI from the blocks of the code bits transferred from the channel encoder. The outputs from the turbo encoder (systematic bits, first parity bits, and second parity bits) each may be first subjected to interleaving. The interleaved bits may enter the circular buffer. The bit selection block extracts as many consecutive bits as the allocated resources from the circular buffer.

(5) Per-Bit Scrambling

LTE downlink scrambling refers to multiplying the blocks of code bits that have undergone the rate matching and HARQ by a per-bit scrambling sequence. In LTE systems, downlink scrambling may apply to code bits of each transport channel.

(6) Data Modulation

Downlink data modulation denotes a process of transforming scrambled bits into corresponding complex modulated symbols. The LTE downlink supports the following modulation schemes: QPSK, 16QAM, and 64 QAM. According to an embodiment of the disclosure, an example in which 256 QAM is also supported as an additional modulation scheme is described. In the modulation schemes, QPSK, 16QAM, and 64QAM respectively may correspond to two bits per symbol, four bits per symbol, and six bits per symbol. Different modulation schemes may be put in use depending on transport channels.

(7) Antenna Mapping

Typically, antenna mapping simultaneously processes modulation symbols corresponding to two transport blocks and maps the processed results to different antenna ports.

(8) Resource Block Mapping

Resource block mapping maps symbols to be transmitted through respective antenna ports to resource elements of resource blocks allocated to transport blocks transmitted to the terminal by an MAC scheduler.

Some resource elements in the resource blocks may be pre-occupied by other antenna port or control region, and such resource elements cannot be put in use.

In order to transmit a data block size to the terminal, the BS may use a downlink control channel (e.g., PDCCH and EPDCCH). The BS may transmit information regarding a data block size transmitted through the PDSCH on the basis of MCS and resource allocation information as modulation and coding rate-related information. The MCS field may transmit MCS information on the basis of 5 bits, for example, to the terminal. As for resource allocation, 1RB to 110RB may be allocated. In a case in which all of 5 bits of the MCS field are used to transmit the MCS information without using MIMO, 32 pieces of MCS information may be transmitted on the basis of 5 bits. In this case, a data block size corresponding to 32×110 may be signaled. However, three pieces of MCS information, among the 32 pieces of MCS information, is used to indicate a change in a modulation scheme when performing retransmission, and thus, in actuality, a data block size corresponding to 29×110 may be signaled. A data block may refer to a transmission block.

As a modulation scheme supported in the LTE system to which the present invention is applied, QPSK, 16QAM, or 64QAM may be used. At a switching point where a modulation scheme is changed, in a case in which the same resource has been allocated, the same data block size may be indicated. This is to effectively perform an operation in various channel environments. In order to indicate an actual data block size, IMCS, MCS-related information transmitted through a downlink control channel, may be mapped to an ITBS, another variable for indicating a data block size. Table 9 below illustrates a relationship between $I_{MCS}$ and $I_{TBS}$.

TABLE 9

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |

TABLE 9-continued

| MCS Index $I_{MCS}$ | Modulation Order $Q_m$ | TBS Index $I_{TBS}$ |
|---|---|---|
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

A transmission block size transmitted to downlink may be determined by a combination of an MCS field transmitted in a downlink control channel and resource allocation. Table 10 and Table 11 below illustrate transmission block sizes in the $I_{MCS}$ to $I_{TBS}$ relationship of Table 8 in case of 10 RB resource allocation in 1 RB and in case of 110 RB resource allocation in 101 RB.

TABLE 10

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 11

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7736 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |

TABLE 11-continued

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

Figure 16:
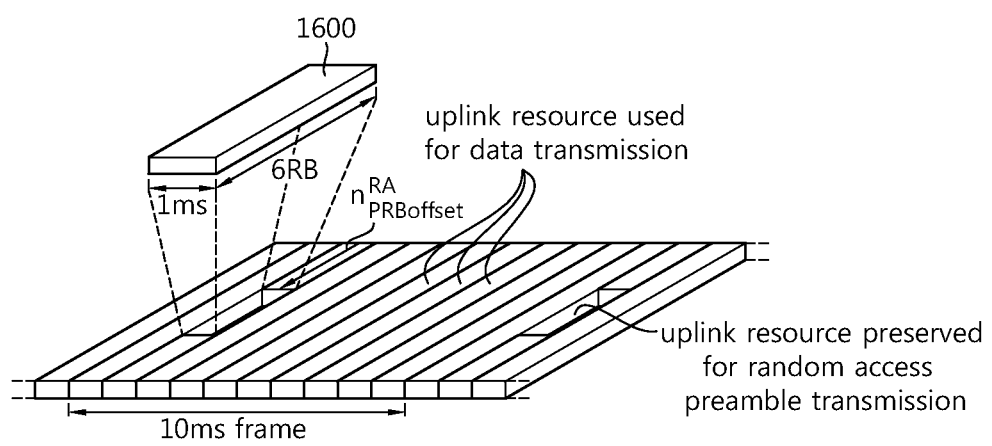
FIG. 16 is a conceptual view illustrating a PRACH used for random access of a terminal, to which the present invention is applied.

FIG. 16 is a conceptual view illustrating a PRACH used for random access of a terminal to which the present invention is applied.

Referring to FIG. 16, a PRACH is a preamble transmitted by a terminal to a BS during a random access process. One PRACH may be transmitted in 6 RB per subframe in FDD. A plurality of terminals may be transmitted through the same PRACH resource 1600 using different preambles. It is determined whether to transmit the PRACH in each subframe or in every subframe according to setting of a transmission period. The resource 1600 in which the PRACH may be transmitted may be known on the basis of PRACH configuration information (PRACH-configuration index). The PRACH configuration index may have values from 0 to 63. $n^{RA}_{PRBoffset}$ may be a parameter for indicating a start frequency specified in a network.

Figure 17:
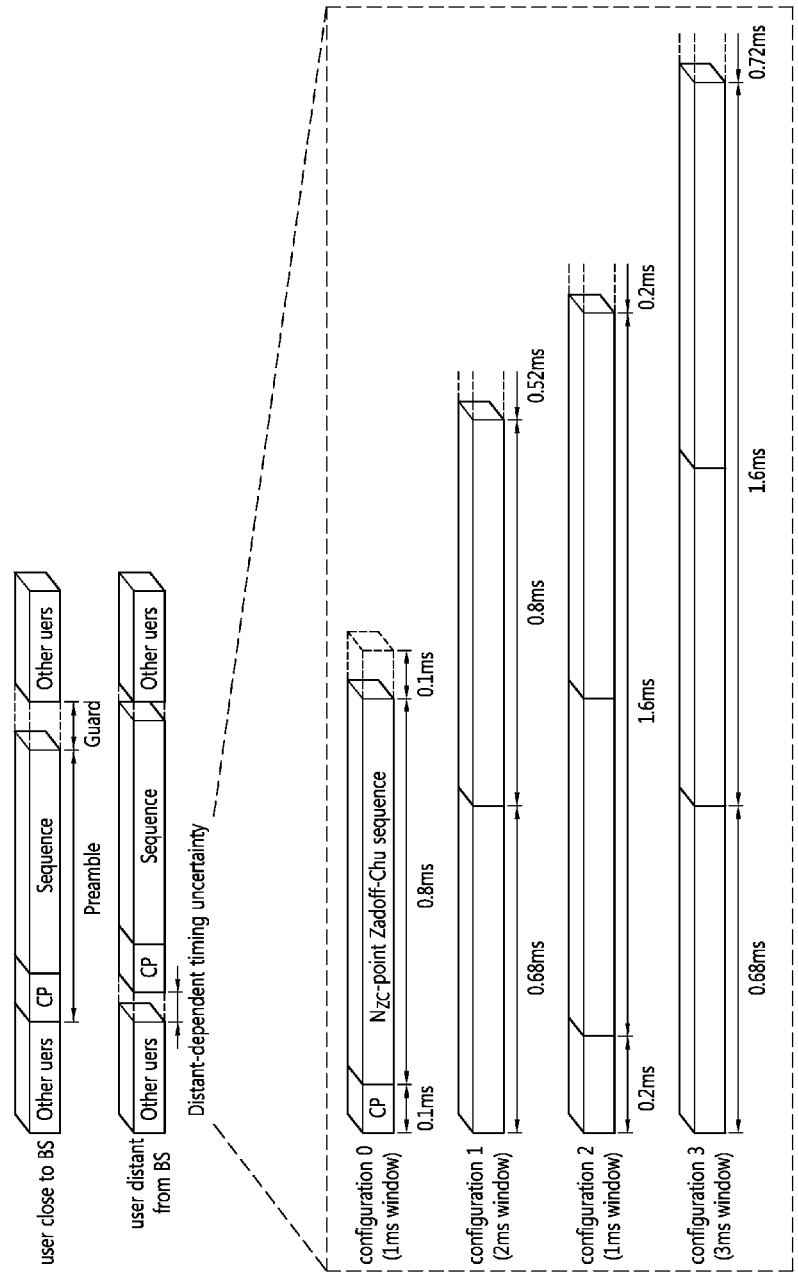
FIG. 17 is a conceptual view illustrating a PRACH to which the present invention is applied.

FIG. 17 is a conceptual view illustrating a PRACH to which the present invention is applied.

Referring to FIG. 17, the PRACH may be transmitted with different lengths of different sequences according to preamble formats. The PRACH may be generated on the basis of 64 available preamble sequences. A preamble may include a CP and a preamble sequence. The CP is a guard space for handling uncertainty of a timing. The preamble sequence may be generated on the basis of a cyclic-shifted Z-C (Zaddoff-Chu) sequence.

Table 12 below illustrates a random access preamble format.

TABLE 12

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (frame structure type 2 only) | $448 \cdot T_s$ | $4096 \cdot T_s$ |

Referring to Table 12, a length of a transmitted preamble may vary according to preamble formats.

The preamble format 0 may be a preamble format transmitted in a general environment (e.g., within 15 kilometers of cell radius). A preamble format 2 and the preamble format 3 may be used in a situation which an SINR is low. In the preamble format 2 and the preamble format 3, a sequence may be repeatedly transmitted. A preamble format 4 may be a preamble format used in a TDD mode.

In a next system of LTE-A, a low-priced/low-specification terminal oriented toward data communication such as reading an electric meter, measurement of a water level, utilization of a monitoring camera, reporting of stock of a vending machine, and the like, is considered. Hereinafter, in an embodiment of the present invention, such a terminal may be defined as a term of a machine type communication (MTC) terminal for the purposes of description. The MTC terminal has characteristics that a transmission data amount is small and data transmission and reception through uplink and downlink occurs intermittently, rather than continuously. Thus, The MTC terminal is required to be lowered in price according to the low data transfer rate and reduce battery consumption. Since data traffic of the MTC terminal occurs intermittently, rather than continuously, an existing channel measurement method and an existing channel measurement result reporting method may not be effective in performing channel estimation.

Also, since data transmission and reception is performed intermittently in the MTC terminal, when data transmission and reception is performed in the MTC terminal once, an operation mode of the MTC terminal may be controlled to be switched to a sleep mode. Thus, it may be more effective for the MTC terminal to perform reliable transmission, rather than employing a procedure of transmission and reception a plurality of times based on an ACKK/NACK process. The MTC device may be installed in an area such as a limited underground, an indoor area, the interior of a building, and the like, and thus, coverage thereof may be limited. Thus, in order to ensure reliable transmission, downlink transmission coverage and uplink transmission coverage of the MTC terminal needs to be enhanced.

Hereinafter, an embodiment of the present invention is to enhance uplink transmission coverage and a downlink transmission coverage of an MTC terminal and provide a scheme of performing reliable transmission without having to perform an HARQ process. In case of using the HARQ process, a correction may be required, but the present invention may be applied thereto. For the purposes of description, a terminal used herein may be used to include both a general legacy terminal and an MTC terminal.

First, a novel PRACH configuring method for supporting a coverage-limited terminal according to an embodiment of the present invention will be described. According to an embodiment of the present invention, a terminal required for coverage enhancement (hereinafter, referred to as a coverage-limited terminal) may transmit a PRACH using a long preamble format in which a length of a preamble is determined on the basis of a baseline RACH sequence. For example, a preamble format in which the baseline RACH sequence is repeated with the long preamble format twice may be used as a second preamble format 2 for a PRACH of the coverage-limited terminal. In this case, in the long preamble format, the baseline RACH sequence may be repeated 16 times for about 12 to 15 TTI.

Meanwhile, in a case in which the long preamble format in which the baseline RACH sequence is repeated is used, an RACH configuration period (e.g., 20 msec) of an existing terminal may not be valid. In the case of using the long preamble format, it has a long duration. For example, in a case in which an MTC terminal uses a long preamble format and a legacy terminal uses an existing preamble, short and long preambles may coexist. In this case, a PRACH of the MTC terminal and a PRACH of the legacy terminal may collide. In order for two PRACHs having different formats to coexist without collision in uplink transmission, in an embodiment of the present invention, a new PRACH configuration index may be defined. Such a new PRACH configuration may also be applied even to a case in which a preamble format is not newly defined. When it is assumed that an existing preamble is repeatedly transmitted, it may be assumed that the existing preamble is repeatedly transmitted only with resource set as a PRACH configuration index and time.

The newly defined PRACH configuration index may be a PRACH configuration index having a period longer than 20 msec. For example, setting of 160 msec with respect to PRACH may be defined as illustrated in Table 13. Table 13 is a table illustrating a newly configured PRACH configuration index.

TABLE 13

| PRACH configuration index | Preamble Format | System Frame Number) | Subframe Number |
| --- | --- | --- | --- |
| 64 | 5 (or new format) | (SFN % 16) = 0 | 0, 80 |

The information regarding the new PRACH configuration index may be transmitted to the terminal through an SIB. An individual SIB may be transmitted to the terminal using a long preamble format. For example, the individual SIB may be transmitted to an MTC terminal suffering a coverage problem. Thus, in the present invention, as the BS transmits the new preamble configuration index to the terminal, the terminal may be supported to use the new long preamble format to enhance coverage. Such a new index may also be applied even when an existing format is repeatedly transmitted.

Meanwhile, together with the PSS/SSS, the terminal may perform tracking on a downlink channel transmitted by the BSs by using a cell-specific RS (CRS). In case of a terminal having a coverage problem, the terminal may not properly perform channel estimation/tracking on the basis of the CRS. Hereinafter, a method for enhancing coverage using a CRS to solve such a problem will be described.

Figure 18:
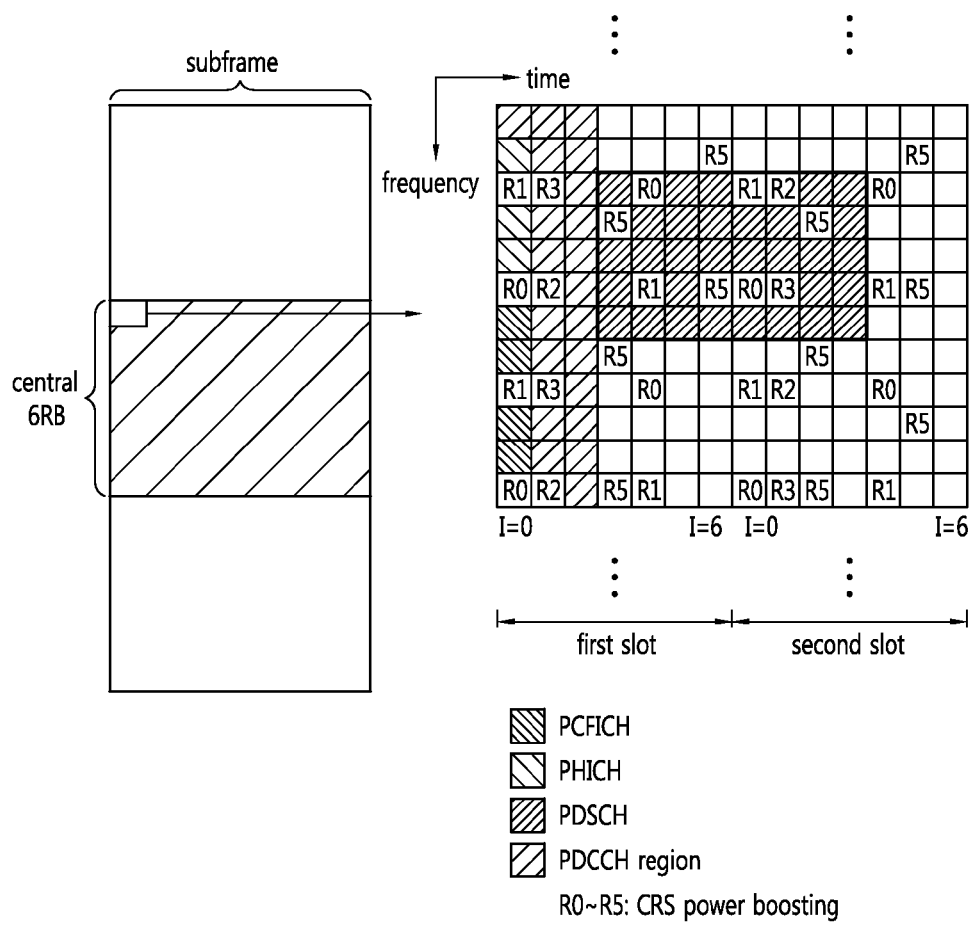
FIG. 18 is a conceptual view illustrating a method of configuring a CRS according to an embodiment of the present invention.

FIG. 18 is a conceptual view illustrating a method of configuring a CRS according to an embodiment of the present invention.

Referring to FIG. 18, a PDSCH may perform additional power boosting on a CRS of an allocated PRB. A PDSCH transmitted to a terminal (for example, when a channel transmission scheme is different from an existing case in a coverage issue) executing a coverage expansion mode is limited to boosting power with respect to a CRS corresponding to allocated PRB. R0 is an RE in which a CRS regarding a first antenna port is transmitted, R1 is an RE in which a CRS regarding a second antenna port is transmitted, R2 is an RE in which a CRS regarding a third antenna port is transmitted, and R3 is an RE in which a CRS regarding a fourth antenna port is transmitted. By performing additional power boosting on the CRSs transmitted in the 6RB (central 6RB) of R0 to R5 and transmitting the same, the coverage-limited terminal may be supported to perform tracking regarding a downlink channel on the basis of the CRSs.

Here, power boosting may include power boosting regarding an additional CRS of the PRB to which a PDSCH has been additionally allocated. For example, in consideration of the fact that the MTC terminal performs a narrow band operation, power boosting regarding a CRS transmitted in a subband region (e.g., central 6RB frequency band) that the MTC terminal may receive may be performed.

Here, in a case in which additional power boosting (e.g., boosting exceeding 3 dB) is used to support the coverage-limited terminal, an influence of the additional power boosting on the legacy terminal should be minimized. To this end, in case of performing additional power boosting, the following methods may be considered in order to minimize an influence on the legacy terminal.

1) For additional power boosting, only a multimedia broadcast single frequency network (MBSFN) subframe may be used.

The MBSFN subframe, a subframe for transmitting a physical multicast channel (PMCH), may be a subframe in which a boosted CRS is transmitted without affecting the legacy terminal in a region other than the PDCCH region composed of first two OFDM symbols. Here, the CRS refers to a reference signal that every terminal within a cell may recognize. Power boosting (e.g., 9 dB power boosting) may be performed on symbols excluding two OFDM symbols that may be demodulated by the legacy terminal. The coverage-limited terminal may perform tracking on the BS on the basis of the power-boosted signal and/or channel transmitted in the other symbols of the MBSFN subframe. To this end, it may be assumed that the CRS is transmitted in the MBSFN for the terminal in the coverage expansion mode.

2) In a resource domain in which the reference signal using additional power boosting is transmitted, QAM (quadrature amplitude modulation)-modulated data may not be transmitted.

In order not to interfere with RRM (radio resource management) measurement, overall power of reference symbols used for RSRP may be equal or a subframe used in performing RRM measurement may be limited. The RRM measurement may include measurement of RSRP (reference signal received power) and RSRQ (reference signal received quality). The RSRP may be power received for the CRS and the RSRQ may be quality of a signal calculated on the basis of the CRS.

When a reference signal used for the coverage-limited terminal to perform tacking is boosted, power of the other remaining RSs may be relatively reduced, whereby overall power of the reference symbols used for the RSRP may become equal to maintain the same RSRP, thus preventing interfering RRM measurement. In this case, power of the other remaining reference symbols, excluding the reference signal used for the coverage-limited terminal to perform tracking, may be reduced, and thus, a greater amount of error may occur when QAM modulation having a relatively high code rate is used. Thus, the QAM-modulated data may be limited not to be transmitted in the resource domain in which the reference signal using additional power boosting is transmitted. For example, when a reference signal is boosted in a particular subframe, the terminal may determine that QAM-modulated data is not transmitted in a power-boosted subframe. That is, in consideration of occurrence of an error, it includes transmission of data on which a phase and an amplitude, that is, I channel and Q channel modulation has not been performed.

As well as the method of power boosting for the CRS, tracking performance of the coverage-limited terminal may be enhanced by allocating an additional resource element to the CRS. Transmission of the additional CRS may be advantageous in that it does not greatly affect the legacy terminal.

Figure 19:
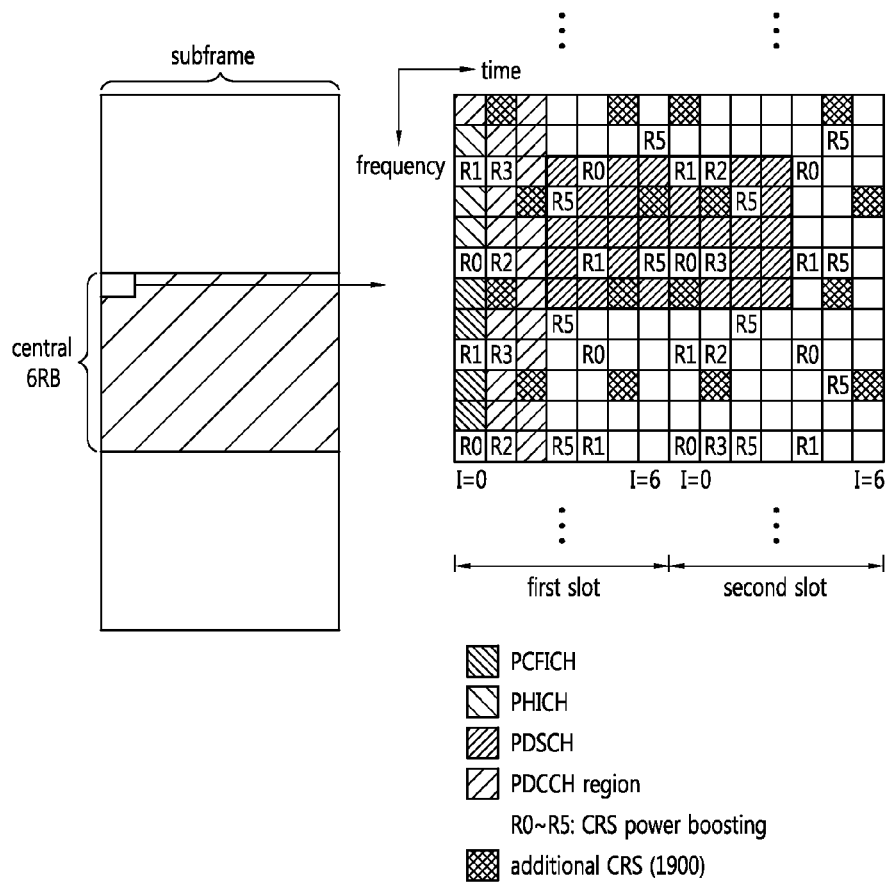
FIG. 19 is a conceptual view illustrating a method of configuring a CRS according to an embodiment of the present invention.

FIG. 19 is a conceptual view illustrating a method of configuring a CRS according to an embodiment of the present invention.

Referring to FIG. 19, it may be configured such that more CRSs than the legacy CRS configuration are transmitted with respect to a frequency band in which the coverage-limited terminal is transmitted. By transmitting additional CRSs 1900, tracking performance of the coverage-limited terminal may be enhanced. This includes additional transmission of the CRSs only in particular PRBs. In particular, the PRBs in which the CRSs are added may be PRBs (for example, central 6RBs) demodulated by the coverage-limited MTC terminal. In another example, the PRBs may be PRBs included in an MBSFN subframe read by the coverage-limited MTC terminal. Alternatively, in a case where a PDSCH is transmitted to a terminal in a coverage expansion mode, the PRBs may be limited to PRBs in which the corresponding PDSCH is transmitted.

1) The additional CRS may be transmitted in a resource element allocated to a DM-RS in a sub-band. A region in which the additional CRS instead of the DM-RS is transmitted may be a narrowband frequency band allocated to the coverage-limited terminal or a PDSCH allocated to the coverage-limited terminal.

2) CRSs are additionally transmitted in OSDM symbols 2 and 3 of each slot.

The additional CRSs may be transmitted in the OFDM symbols 2 and 3 having the same frequency band as the frequency band in which the CRSs are transmitted in OFDM symbols 0 and 1.

A band in which the CRSs are additionally transmitted in the OFDM symbols 2 and 3 may be a frequency band allocated to the coverage-limited terminal or a frequency band in which a PDSCH allocated to the coverage-limited terminal exists. For example, if the antenna port 0 is used as a single antenna port in the CRS transmission, positions of resource elements for the CRSs transmitted in other antenna port, the same as positions of CRSs transmitted in the antenna port 1 and 2/3, may be used as additional CRS resource elements. If it is required to transmit a larger number of CRSs, CRSs may be additionally used also in resource elements corresponding to other OFDM symbols and subcarriers.

3) Resource elements corresponding to Vshift_new=Vshift_org+1 (or k) are used as CRS s In another method, an additional CRS may be provided to the coverage-limited terminal by transmitting other aggregation of CRSs using 1 or k-increased Vshift. Vshift may be a variable for changing a position in which a CRS is transmitted. For example, in a case where a CRS corresponding to Vshift_org=0 is used for initial CRS transmission, Vshift_new=2 may be used for transmitting a second aggregation. If other aggregation is required, a CRS aggregation corresponding to Vshift_new=4 may be transmitted as additional CRS s. Similarly, by defining Hshift, transmitted CRS s may be determined to be different according to positions of OFDM symbols in which CRSs are transmitted. For example, in case of Hshift=2, second aggregation of CRSs may be transmitted through a frequency band in which the CRSs are transmitted in OFDM symbols 1 and 2, in OFDM symbols 2 and 3 of each slot. Positions of additionally transmitted CRSs may be determined by using both Vshiaft_new and Hshift. That is, a position of an OFDM symbol in which the CRSs are transmitted and an aggregation of CRSs transmitted in a corresponding symbol may be determined. A second aggregation of CRSs may be positioned in OFDM symbols 2 and 3 on the basis of Vshift_new=Vshift_org+2 and a third aggregation of CRSs may be positioned in OFDM symbols 4 and 5 on the basis of Vshift_new=Vshift_org+4 and transmitted.

(4) In a case where power boosting is performed on the coverage-limited terminal, an influence on the legacy terminal and an MTC terminal which is not required to enhance coverage needs to be reduced. Thus, additional power boosting may be limited to additional CRS resource elements with respect to the coverage-limited terminal. When power boosting is used for the entire frequency band of the coverage-limited terminal using a narrow band, a power boosting rate in consideration of the additional power boosting may be transmitted to the terminal and the terminal may execute appropriate QAM demodulation. As well as CRSs, even a demodulation reference signal (DM-RS) used for demodulating a PDSCH may also be newly set for the coverage-limited terminal.

Meanwhile, in order to enhance demodulation performance on a DM-RS transmitted to the coverage-limited terminal, the following method may be used. The DM-RS may be a reference signal for demodulating a PDSCH and a reference signal for demodulating a PUSCH. Hereinafter, an embodiment of the present invention may be applied to both a downlink DM-RS and an uplink DM-RS.

In addition, an additional resource element may be selected to transmit a redundant DM-RS. In addition, when additional power boosting than the currently defined power boosting (e.g., 3 dB) is considered for a DM-RS, an additional DM-RS may be transmitted as follows. First, for the purposes of description, a DM-RS with respect to a PDSCH transmitted through downlink may be described as follows.

In a case where a single-layer transmission with respect to the coverage-limited terminal is used, a first aggregation of DM-RSs may include DM-RS resource elements regarding a normal subframe transmitted in an antenna port 7. When a normal DM-RS is used, for example, 12 resource elements per PRB may be used.

If density of the DM-RSs is doubled, DM-RSs transmitted for a special subframe configurations 3 and 4 or 8 may be additionally used in DM-RSs transmitted on the basis of antenna port 7. In this case, 12 DM-RSs may be additionally transmitted in the OFDM symbols 2 and 3 in each slot.

If density of the DM-RSs increases to four times, a first aggregation (DM-RSs transmitted in an antenna port 7 of a normal subframe and special subframe configurations 3, 4, or 8) and a second aggregation (the first aggregation and DM-RSs transmitted in antenna port 9 in a normal subframe) may be used to transmit a demodulation reference signal.

When an extended CP is used (in case of an extended subframe, rather than a normal subframe), additional resource elements of DM-RSs may be positioned in OFDM symbols 1 and 2 of each slot. An additional RS with respect to the extended subframe collide with CRSs, and thus, resource element positions of the DM-RSs may be changed on the basis of Vshift. For example, a CRS may be transmitted in a resource element in which Vshift is set to 0, and a frequency band in which a DM-RS defined in a normal subframe, rather than in an extended subframe, is transmitted may be used for transmitting the DM-RSs. For example, subcarriers 2, 5, 8, and 11 for a first slot and subcarriers 3, 6, 9, and 12 for a second slot may be used to transmit the DM-RSs in the extended subframe.

As described above, with respect to the coverage-limited terminal, both the CRS configuration and DM-RS configuration may be used or the CRS configuration and DM-RS configuration may be selectively used. In order to enhance modulation performance regarding CRS and DM-RS transmitted to the coverage-limited terminal, the following method may be additionally used.

In a case where an MTC terminal requesting coverage enhancement operates in a narrow bandwidth (e.g., 6PRB), an EPDCCH, rather than PDCCH, may be used for transmitting a control channel. In this case, an EPDCCH or a PDCCH based on a CRS or a DM-RS may be transmitted additionally in a CRS (or TRS in a cell (e.g., NCT) in which reference signals are transmitted in a reduced form). According to an embodiment of the present invention, in order to enhance channel estimation performance, a CRS (or a TRS) and a DM-RS may be simultaneously used for channel estimation. The CRS (or TRS) and the DM-RS may be simultaneously used for channel estimation through various implementations.

In order to use a CRS (or a TRS) and a DM-RS for channel estimation, the terminal may need to know a precoding matrix used in the DM-RS. Thus, information for indicating a precoding matrix used in the DM-RS or a predetermined precoding may be transmitted through higher layer signaling. In another method, precoding for a DM-RS may not be used or predetermined precoding may be assumed.

Whether a terminal may simultaneously use a CRS (or a TRS) and a DM-RS may be indicated by using higher layer signaling or an indicator of an MIB (PBCH) or an SIB. When the indicator indicating whether the terminal simultaneously uses a CRS (or a TRS) and a DM-RS is turned on, it may be assumed that the terminal uses precoding for the DM-RS or predetermined precoding is used for DM-RS.

Higher layer signaling may be used to change a precoding matrix or allow for precoding for a DM-RS. In addition to precoding used for DM-RS, the terminal may assume that an antenna port used for CRS (or TRS) and an antenna port used by the DM-RS are the same such that channels are the same.

According to another embodiment of the present invention, a wide frequency bandwidth for an RS may be used, compared with a PDSCH frequency band.

In order to increase density of RSs, a frequency bandwidth wider than a frequency bandwidth in which a PDSCH is transmitted may be used for RS transmission. For example, when a BS supports a 10 Mhz system bandwidth and an MTC terminal requiring coverage enhancement operates in 1.4 Mhz system bandwidth, the terminal may perform channel estimation on 3 Mhz, instead of 1.4 Mhz in order to enhance channel estimation performance. This method may not be used for a narrowband carrier (e.g., 1.4 Mhz), and since the terminal should know a maximum system bandwidth, a PBCH, an SIB, or higher layer signaling may be given to indicate a system bandwidth of a carrier.

Downlink data of different configurations may be received according to degrees of coverage enhancement required by the terminal. Hereinafter, a method for enhancing coverage of terminals each requesting different coverage enhancement will be described in an embodiment of the present invention.

Figure 20:
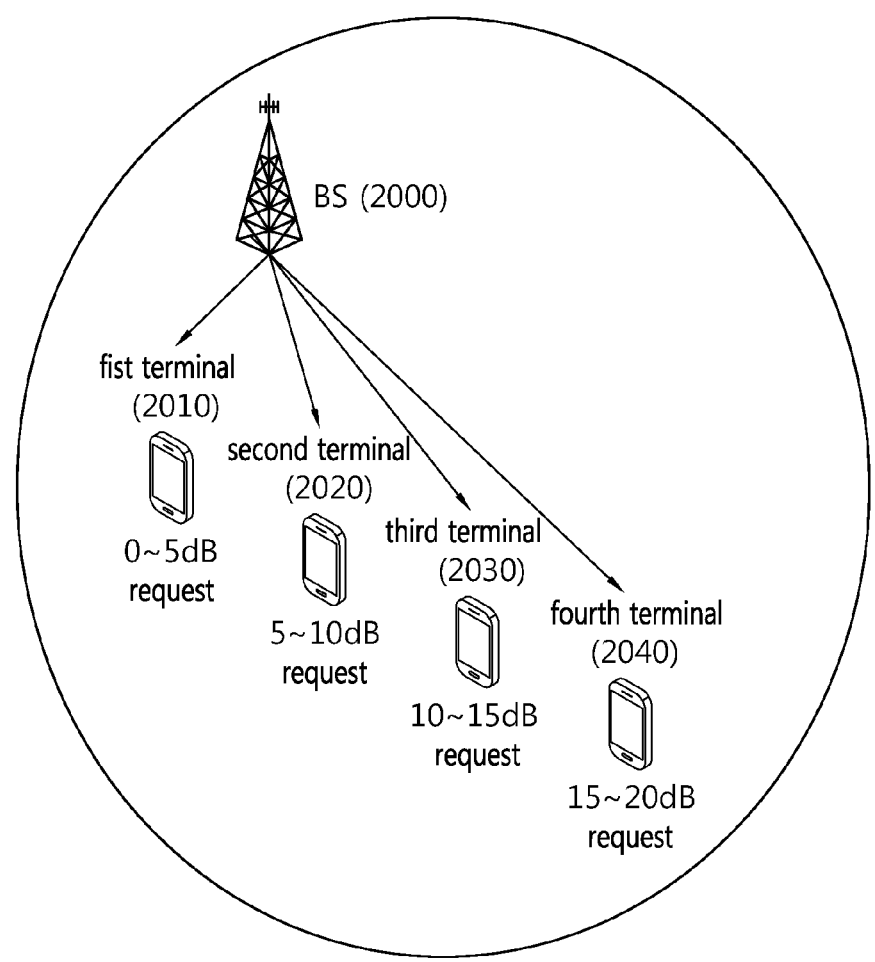
FIG. 20 is a conceptual view illustrating a method of transmitting and receiving data by a coverage-limited terminal according to an embodiment of the present invention.

FIG. 20 is a conceptual view illustrating a method of transmitting and receiving data by a coverage-limited terminal according to an embodiment of the present invention.

Referring to FIG. 20, coverage-limited terminals requiring coverage enhancement may request different degrees of coverage enhancement from a BS 2000. For example, degrees of enhancement requested by coverage-limited terminals may be different according to locations of the coverage-limited terminals. For example, a first terminal 2010 may require enhancement of strength of a downlink signal of 0 to 5 dB, a second terminal 2020 may require enhancement of strength of a downlink signal of 5 to 10 dB, a third terminal 2030 may require enhancement of strength of a downlink signal of 10 to 15 dB, and a fourth terminal 2040 may require enhancement of strength of a downlink signal of 15 to 20 dB.

In a case where a greater coverage enhancement is required, greater overhead may be required for data transmitted by the terminal. Thus, a degree of coverage enhancement may be adaptively determined on the basis of information regarding how great enhancement is required for each terminal. To this end, a broadcast channel such as a PBCH may be configured to be transmitted on the assumption of a terminal which desires coverage enhancement to the maximum so as to be resistant an error. However, a unicast channel with respect to a particular terminal such as a PDSCH may adaptively perform an operation required for coverage enhancement on the basis of a degree of coverage enhancement required for each terminal.

In order to determine information regarding coverage enhancement required for a terminal, various types of information may be used. For example, information regarding coverage enhancement required for a terminal may be determined on the basis of (1) information regarding the number of PSS/SSSs received by the terminal for decoding the PSS/SSSs, (2) information regarding an average SINR received by the terminal such as RSRP, (3) information regarding an average number of PBCHs received by the terminal for decoding an MIB, and (4) BS determination information based on RACH reception.

When (1), (2), and (3) are used, required coverage-enhancement information may be signaled from the terminal to the BS. Thus, accurate coverage-enhancement may be used to transmit a PDSCH or an RS from the BS to the terminal.

In an embodiment of the present invention, an operation of a BS performed according to a coverage enhancement request required by a coverage-limited terminal is proposed. For example, it may include grouping coverage enhancement requested by a terminal to a predetermined range and adaptively performing an operation of the BS according to a coverage enhancement request group. The BS may transmit data to the terminal by using different RS transmission densities, different repeated transmissions and repeated number, different MCSs, and the like, according to each coverage enhancement request group.

An example is illustrated in Table 14 below. A group of terminals for requesting coverage enhancement of the terminals may be transmitted to the terminals through higher layer signaling. When terminals fail to receive information regarding a group thereof for requesting coverage enhancement through higher layer signaling, a coverage enhancement request may be made by setting a coverage enhancement group of the terminals to a maximum coverage enhancement request group. For example, the maximum coverage enhancement request group may be set to a default value.

TABLE 14

| Requirement | RS density | RACH Repetition | TTI Bundling |
|---|---|---|---|
| 0-5 dB | Once (normal subframe port 7) | 2 | 4 |
| 5-10 dB | Twice (normal subframe port 7 + special subframe conf 3 port 7) | 4 | 32 |
| 10-15 dB | Four times (normal subframe port 7/8 + special subframe conf 3 port 7/8) | 8 | ~100 |
| 15-20 dB | Four times (normal subframe port 7/8 + special subframe conf 3 port 7/8) | 16 | ~300 |

Referring to Table 14, in the case of the first coverage enhancement request group (0 to 5 dB), density of the reference signals (DM-RSs) of the BS transmitted to the coverage-limited terminal may be the same as that of the existing case. The terminal may transmit a generated PRACH by repeating a sequence twice. Also, the terminal may transmit continuous data having four different redundant versions which have performed TTI bundling to the BS. The TTI bundling may also be applied to a downlink channel.

In the case of the second coverage enhancement request group (5 to 10 dB), density of the reference signals (DM-RSs) of the BS transmitted to the coverage-limited terminal may be two times the existing case and transmitted. When transmitting a PRACH, the terminal may transmit the generated PRACH by repeating a sequence four times. Also, the terminal may transmit continuous data having 32 different redundant versions which have performed TTI bundling to the BS.

In the case of the third coverage enhancement request group (10 to 15 dB), density of the reference signals (DM-RSs) of the BS transmitted to the coverage-limited terminal may be four times the existing case and transmitted. When transmitting a PRACH, the terminal may transmit the generated PRACH by repeating a sequence eight times. Also, the terminal may transmit continuous data having 100 different redundant versions which have performed TTI bundling to the BS.

In the case of the fourth coverage enhancement request group (15 to 20 dB), density of the reference signals (DM-RSs) of the BS transmitted to the coverage-limited terminal may be four times the existing case and transmitted. When transmitting a PRACH, the terminal may transmit the generated PRACH by repeating a sequence 16 times. Also, the terminal may transmit continuous data having 300 different redundant versions which have performed TTI bundling to the BS.

Referring to Table 14 described above, in another example of the present invention, different groupings may be performed according to a request from a coverage-limited terminal, and operations of the BS and the terminal may be controlled to be performed accordingly. Thus, the scope of the present invention is not limited to Table 14. Also, according to another example of the present invention, the coverage extension level request may be set by the BS, and after the coverage extension level request is set, it may be used as a method for designating with which RS density and TTI bundling number it should operate by the terminal.

Meanwhile, a case in which an MBSFN subframe is used to perform communication between the coverage-limited terminal and the BS, or a case in which an NC subframe is used to perform communication between the coverage-limited terminal and the BS may also be assumed. In this case, the coverage-limited terminal may not perform sufficient tracking based on a normal CRS or TRS. Thus, an additional RS for tracking may need to be defined. Thus, an additional RS for tracking may be defined as a reference signal transmitted by increasing density of CRSs or TRSs higher than that of the existing case, thus enhancing tracking performance.

In another method, tracking performance of the terminal may be enhanced on the basis of a DM-RS. According to an example of the present invention, when a DM-RS-based method is used, the DM-RS may be used as a group-specific RS, rather than as a terminal-specific RS. That is, referring to Table 14, for example, a group-specified RS may be applied according to a coverage enhancement request group. Here, according to an example of the present invention, different power boosting may be applied to the RS according to the coverage enhancement request group, or a repeated RS transmission may be included, for example, a plurality of coverage-limited terminals may share the same DM-RS pattern regardless of whether a terminal-specific PDSCH exists.

For example, a case in which central 6RBs are allocated to coverage-limited terminals in an MBSFN subframe may be assumed. Each coverage-limited terminal may receive a DM-RS in which nscid=0 or 1 regardless of a value of nscid defined in a DCI format 2B or 2C (if used) of the central 6RBs of the MBSFN subframe, thereby assuming a DM-RS of the same pattern. In a case where density of DM-RSs is the worst case, the terminals share the DM-RS of the same pattern regardless of whether a PDSCH exists, thereby performing tracking on a downlink channel with respect to the BS.

According to an embodiment of the present invention, for a particular terminal, a short PBCH excluding predetermined information may be transmitted with respect to a PBCH transmitted to the legacy terminal. In the existing case, a MIB (master information block) or an SIB (system information block) may be used to transmit system information. The MIB includes a downlink cell bandwidth, a system frame number, and the like, and may be transmitted through a PBCH. The SIB may be defined by SIB0~SIB10 included therein and used. The SIB may be transmitted through a PDSCH.

In particular, an MTC terminal having a narrow bandwidth may not require partial information (e.g., system bandwidth and/or PHICH configuration information) among information transmitted by the PBCH. Thus, coverage of the terminal may be enhanced by increasing a coding gain by increasing coding efficiency on the basis of very short PBCH omitting unnecessary information.

In a case where a subframe transmitting the MIB is fixed to a subframe corresponding to 0 or 0/5 with respect to each radio frame, the coverage-limited terminal may transmit the MIB through an (E)PDCCH and/or PDSCH similar to the SIB-1. In addition, the MIB and the SIB-1 may be combined to include essential information which cannot be previously determined or hard-coded.

For example, a newly defined SIB (SIB 0) may be expressed as shown in Table 15. The new SIB may not transmit partial information with respect to a terminal (e.g., a coverage-limited terminal).

TABLE 15

| | |
|---|---|
| SystemInformationBlockType0 ::= | SEQUENCE { |
| systemFrameNumber | BIT STRING (SIZE (8)), |
| supportNarrowBandMTC | ENUMERATED {0,1} #0 for disabled or #1 for enabled |
| } | |

Referring to Table 15, only system frame number and information regarding whether a particular terminal (e.g., a narrowband MTC terminal) are supported may be transmitted.

Alternatively, according to another example of the present invention, a combination of SIB 0 and SIB 1 may be considered in the form as shown in Table 16 below.

TABLE 16

| | |
|---|---|
| SystemInformationBlockType0-1 ::= | SEQUENCE |
| systemFrameNumber | BIT STRING (SIZE (8)), |
| supportNarrowBandMTC | ENUMERATED {0,1} #0 for disabled or #1 for enabled |
| cellAccessRelatedInfo | SEQUENCE { |
| plmn-IdentityList | PLMN-IdentityList, |
| trackingAreaCode | TrackingAreaCode, |
| cellIdentity | CellIdentity, |
| cellBarred | ENUMERATED{barred, notBarred}, |
| intraFreqReselection | ENUMERATED {allowed, notAllowed}, |
| }, | |
| cellSelectionInfo | SEQUENCE { |
| q-RxLevMin | Q-RxLevMin, |
| }, | |
| freqBandIndicator | INTEGER(1..64), |
| schedulingInfoList | SchedulingInfoList, |
| tdd-Config    TDD-Config | OPTIONAL,  -- Cond TDD |
| si-WindowLength | ENUMERATED {ms1, ms2, ms5, ms10, ms15, ms20, ms40}, |
| systemInfoValueTag | INTEGER (0..31), |
| } | |

If a PBCH is transmitted only four times at an interval of 10 msec within 40 msec, the coverage-limited terminal may not be able to detect the PBCH within 40 ms. Thus, in the case of the coverage-limited terminal, the PBCH may be transmitted more frequently than 10 msec such that the terminal may detect the PBCH within 40 ms or change an SFN bit to 7 bits. For example, 3 LSB among 7 bits may be detected by decoding of the PBCH, and an aggregation of PBCHs may be transmitted over 80 msec.

Hereinafter, several methods for transmitting a redundant PBCH in the form including a new PBCH in addition to an existing PBCH and a repeated PBCH with respect to the coverage-limited terminal will be described in detail.

Figure 21:
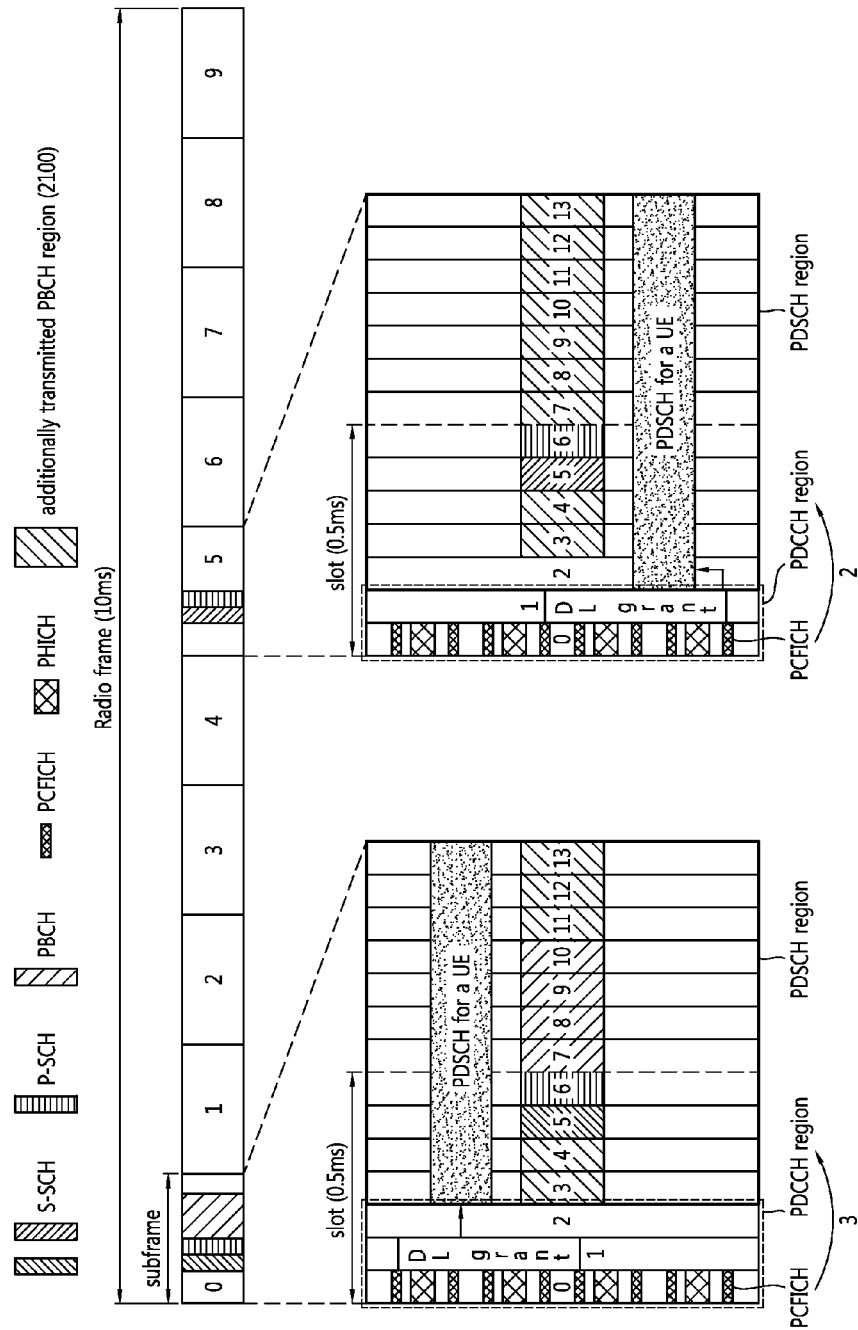
FIG. 21 is a conceptual view illustrating a method of transmitting a PBCH according to an embodiment of the present invention.

FIG. 21 is a conceptual view illustrating a method of transmitting a PBCH according to an embodiment of the present invention.

Referring to FIG. 21, an additional redundant PBCH may be transmitted in an additional resource domain (central 6RB region) 2100 as well as in an existing PBCH transmission region. The additional PBCH may be transmitted in the central 6RB among the OFDM symbols after the PDCCH allocation region of the subframe 0 to subframe 5. Here, the redundant PBCH may also use the entirety of a portion of OFDM symbols excluding the existing PSS, SSS, and PBCH regions in the central 6RB region. Also, in a case where the DM-RS cannot be transmitted in a transmission mode 9 and a transmission mode 10, the additional PBCH may be allocated even in the corresponding resource region. Hereinafter, transmission of the additional PBCH will be described in detail.

(1) Transmission of redundant PBCH: The PBCH may be repeatedly transmitted in a different resource domain. For example, the same PBCH may be repeatedly allocated in a first slot (or the other remaining OFDM symbols not used as PSS/SSS/PDCCH by using OFDM symbols 1 to 4. The redundant versions of the repeated transmitted PBCH may be differently set to enhance decoding performance when they are received by the terminal.

For example, in a case where a duplexing method in a first slot of a subframe #0 is FDD, the PBCH may be transmitted in the OFDM symbols 2, 3, and 4, and in a case where the duplexing method is TDD, the PBCH may be transmitted in OFDM symbols 5 and 6. Also, in a second slot of subframe #0, in case of the FDD mode, the PBCH is transmitted in OFDM symbol 5, and in the TDD mode, the PBCH may be transmitted in OFDM symbols 4 and 5. Similarly, the same PBCH may be repeatedly transmitted in the subframe #5. For example, different redundant PBCH may be transmitted in OFDM symbols 0 to 3 in a second slot, or a first slot or any other OFDM symbol. If necessary, additional redundant PBCH transmission may be performed in mutually different subframes like a subframe #1 and a subframe #5.

(2) Additional transmission of new PBCH: For example, a PBCH with respect to a particular terminal such as an MTC terminal may be newly defined as an MTC-PBCH and used. In order to transmit a new PBCH with respect to an MTC terminal, a redundant MTC-PBCH may be transmitted in the same position as that of the method of 1). Here, the MTC-PBCH is composed of small bits compared with a normal PBCH, and thus, two OFDM symbols may be used to transmit the MTC-PBCH, instead of using four OFDM symbols. Also, in a single subframe #0, three MBC-PBCH may be transmitted, and five MTC-PBCHs may be transmitted in other subframe. For example, the MTC-PBCHs may be transmitted by using OFDM symbols 2 and 3 in a first slot, 4+4 OFDM symbols in each slot, and 0-1/2-3/5-6 in a second slot with respect to FDD.

In addition, in case of using a new PBCH or an additionally repeated PBCH, the new PBCH or the repeated PBCH may be transmitted through the entire OFDM symbols, excluding OFDM symbols used for a PDCCH, or may be transmitted through 3 to 13 OFDM symbols (normal CP) or 3 to 11 OFDM symbols (extended CP). Here, a bandwidth or the number of entire carriers used for PBCH transmission may be limited to a small number of PRBs such as 1 or 2 PRBs. Here, a repeated SIB may be generally applied for the coverage-limited terminal. Here, the OFDM symbols used for the PBCH may include OFDM symbols for transmitting the PBCH using additional power or OFDM symbols multiplexed with other signals for supporting other UEs including an existing latent legacy terminals and transmitted. Here, the PBCH may include a PBCH extending to the entire subframes or the OFDM symbols, and repeated PBCH may be implemented, and here, when PSS/SSS is not transmitted, a final symbol may be used to transmit the PBCH.

As described above, the number of PRBs for the PBCH may be limited to one or two PRBs. Here, power for transmitting the PBCH, the same as the power used for transmitting six PRBs, may be used. That is, when the PBCH is transmitted through 1 PRB, 6-fold power boosting (×6 times, (7 dB)) is applied, or when the PBCH is transmitted through the 2PRB, 3-fold power boosting (×3 times, (4 dB)) may be applied. Here, in a case where the power boosting is applied in the 6 PRBs allocated for the PBCH transmission, any other data, excluding 1 or 2 PRBs used for transmission of the PBCH and/or CRS for supporting the power boosting, may not be transmitted.

Meanwhile, the two following techniques may be considered to transmit a redundant PBCH. One is a circular repetition, and the other is a simple repetition technique.

Figure 22:
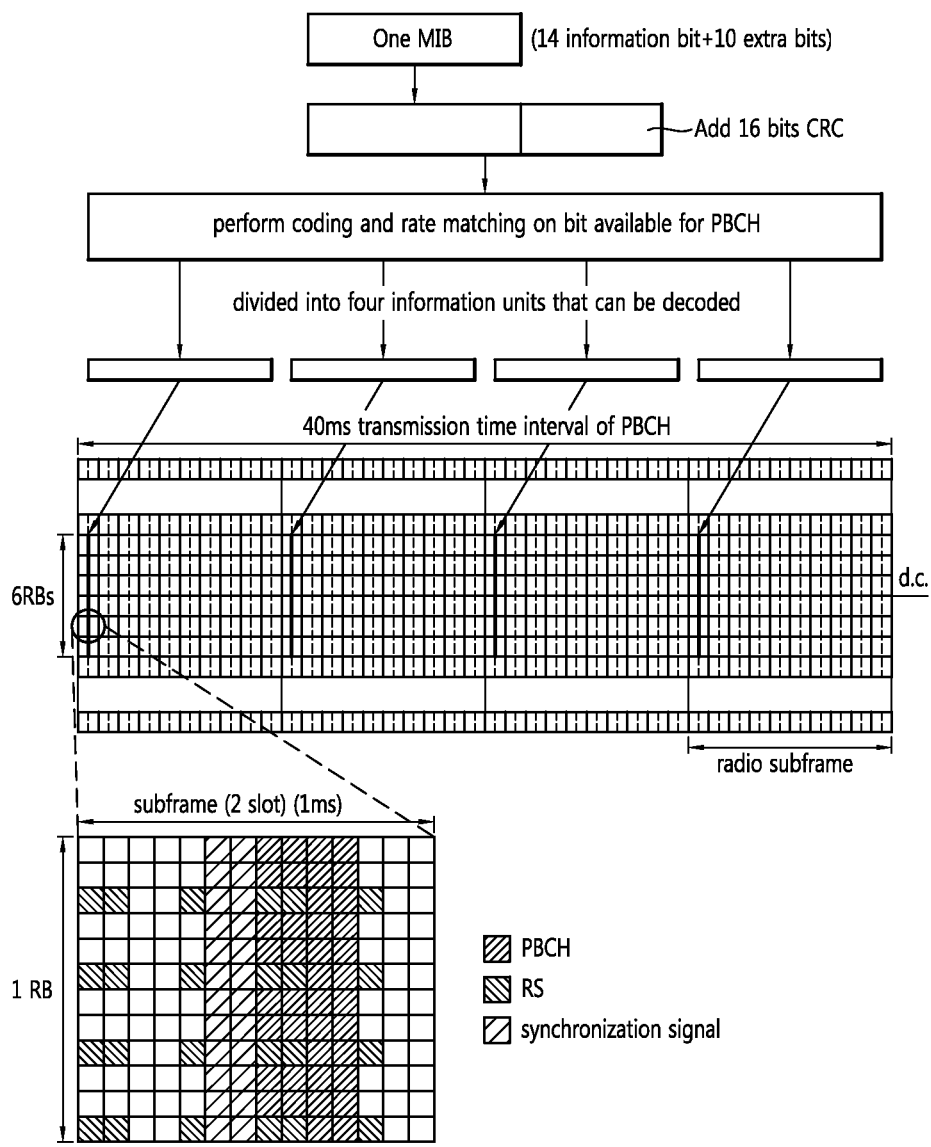
FIG. 22 is a conceptual view illustrating a method of transmitting a PBCH according to an embodiment of the present invention.

FIG. 22 is a conceptual view illustrating a method of transmitting a single MIB through a PBCH according to an embodiment of the present invention.

In FIG. 2, a method of transmitting one MIB through a PBCH is disclosed. One MIB may include 14 information bits and 10 reserved bits. In order to transmit one MIB, a CRC (16 bits) may be additionally attached. Coding and rate matching may be performed on PBCH data with available bits. Coding and rate matching-performed bits may be divided into four units that can be decoded individually. According to an embodiment of the present invention, four divided information units may be transmitted through the circular repetition or the simple repetition.

Figure 23:
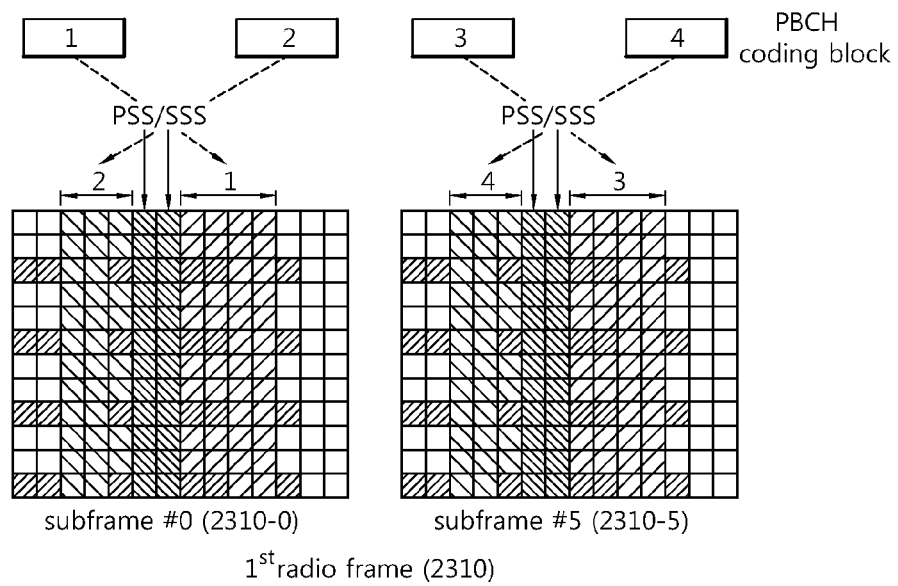
FIG. 23 is a conceptual view illustrating a method of transmitting a PBCH using a circular repetition method according to an embodiment of the present invention.
Figure 23:
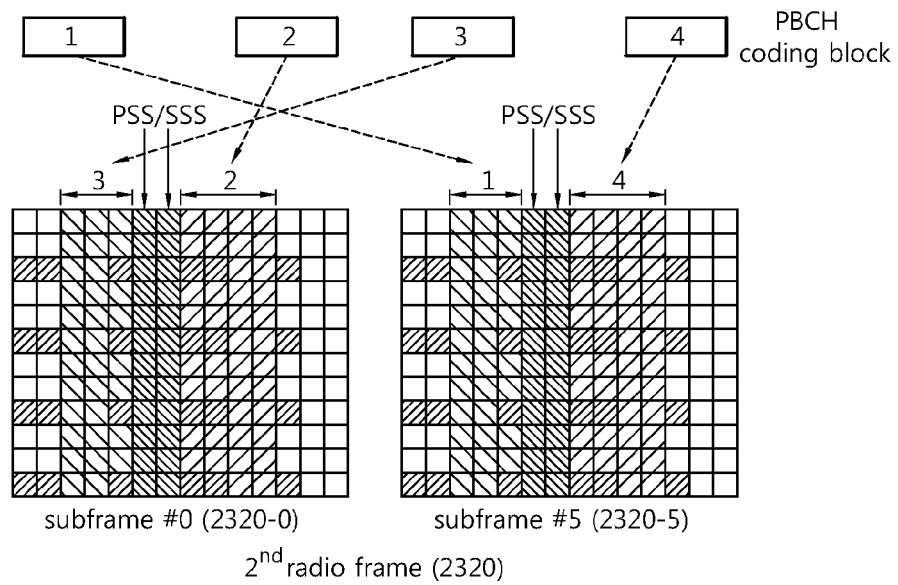

FIG. 23 is a conceptual view illustrating a method of transmitting a PBCH using a circular repetition method according to an embodiment of the present invention.

Referring to FIG. 23, in case of using the circular repetition method, the MTC-PBCH or the legacy PBCH may be repeatedly transmitted in a radio frame on the basis of the circular repetition method. For example, as illustrated in FIG. 22, one MIB is coded and divided into four code blocks. For example, in every radio frame, repetitions may be performed twice in the subframe #0, and other repetitions may be performed twice in subframe #5. The code blocks 1/2/3/4 may be transmitted in the circular repetition method as illustrated in FIG. 23. Four code blocks obtained by dividing one MIB may be transmitted on the basis of different allocation methods in a plurality of radio frames.

For example, in the first radio frame 2310, a first code block and a second code block may be transmitted in subframe #0 (2310-0) and third code block and a fourth code block may be transmitted in a subframe #5 (2310-5). In the second radio frame 2320, the third code block and the second code block may be transmitted in the subframe #0 (2320-0) and the first code block and the fourth code block may be transmitted in the subframe #5 (2320-5). That is, four code blocks may be circulatively and repeatedly transmitted in different resource allocation positions in different radio frames FIG. 24 is a conceptual view illustrating a method of transmitting a PBCH using simple repetition according to an embodiment of the present invention.

Figure 24:
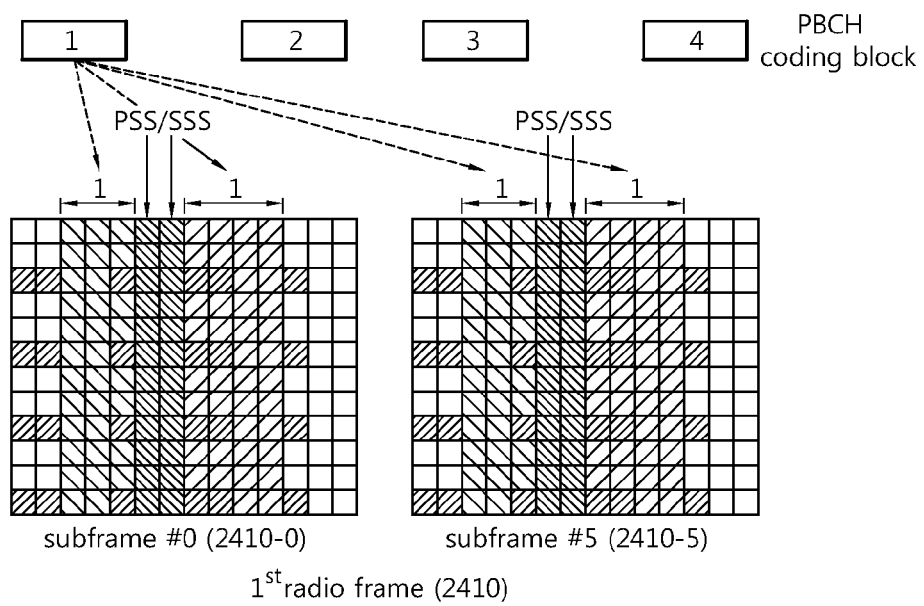
FIG. 24 is a conceptual view illustrating a method of transmitting a PBCH using simple repetition according to an embodiment of the present invention.
Figure 24:
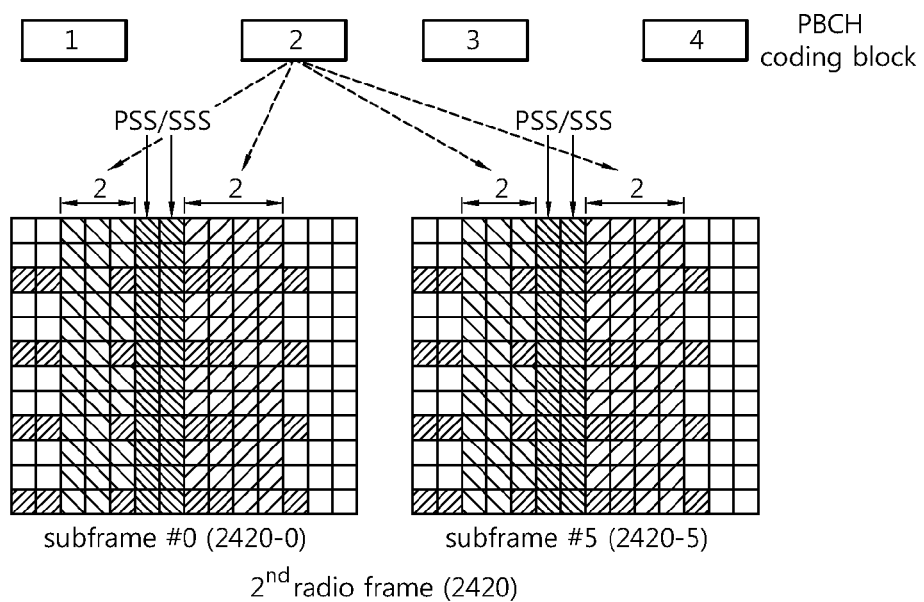

Referring to FIG. 24, in case of using the simple repetition method, an MTC-PBCH or a legacy PBCH may be repeated in a radio frame. The circular repetition method may be repeatedly executed in a single radio frame. For example, one MIB may be coded and may be divided into four code blocks as illustrated in FIG. 22. It may be assumed that repetition is performed twice in the subframe #0 and other repetition is performed twice in subframe #5. The same code blocks of the radio frame may be transmitted as illustrated in FIG. 24.

Among the four code blocks, a first code block may be transmitted twice each in the subframe #0 (2410-0) and subframe #5 (2410-5) included in the first radio frame 2410, and thus, the first code block may be transmitted repeatedly a total of four times. Among the four code blocks, the second code block may be transmitted twice each in the subframe #0 (2420-0) and subframe #5 (2420-5) included in the second radio frame 2420, and thus, the second code block may be transmitted repeatedly a total of four times. The third code block and the fourth code block may be repeatedly transmitted in the same manner. In this manner, one code block may be transmitted repeatedly in one radio frame.

Hereinafter, a method of adaptively transmitting a PBCH and other downlink channel by a BS with respect to various levels (0 to 5 dB, 5 to 10 dB, etc.) requesting coverage enhancement (handling different levels of coverage enhancements) according to an embodiment of the present invention will be described. Here, a coverage-limited terminal may determine coverage enhancement request information thereof by measuring or reading an acquisition time of a PSS/SSS or a detect signal.

For example, in order to request coverage enhancement, the coverage-limited terminal may request an operation of the BS for coverage enhancement with respect to four different levels (e.g., 0 dB, 5 dB, 10 dB, and 20 dB). For example, with respect to repetition of a PBCH, in a case where coverage request information of the terminal is 0 dB, it may be assumed that non-repetition is requested because legacy PBCH is sufficient. In a case where coverage request information of the terminal is 5 dB, it may mean that repetition of the PBCH is requested twice from the BS (for example, 8 PBCHs for 40 ms). In a case where coverage request information of the terminal is 10 dB, it may mean that repetition of the PBCH is requested four times from the BS (for example, 16 PBCHs for 40 ms). In a case where coverage request information of the terminal is 20 dB, it may mean that repetition of the PBCH is requested 40 times from the BS (for example, 40 PBCHs for 40 ms).

A radio frame for transmitting a PBCH with respect to the coverage-limited terminal needs to be determined. If not, the coverage-limited terminal may not be able to successfully detect a PBCH transmitted by the BS. The radio frame in which the PBCH is transmitted may be determined on the basis of coverage enhancement request information requested by the terminal. For example, a redundant PBCH may be transmitted at every five minutes, based on which the MTC terminal may receive the PBCH. The PBCH may be transmitted at the interval of five seconds for 40 ms with respect to a predetermined time (for example, 0 hour (midnight)). The PBCH is transmitted for 40 ms with respect to 0 h 0 m 0 s, and a redundant PBCH may be transmitted for 40 ms with respect to 0 h 0 m 5 s. A transmission level of the redundant PBCH according to coverage enhancement may be classified as follows.

(1) In a case where four PBCHs (legacy PBCHs) are transmitted for 40 ms, it may be a redundant PBCH level 1. In the redundant PBCH level 1, the PBCHs may be allocated in the positions where the existing legacy PBCHs are transmitted, and transmitted to the terminal. The four PBCHs may be L PBCH1, L PBCH2, L PBCH3, and L PBCH4, respectively.

(2) in a case where five PBCHs are required to be repeated with respect to a 5 dB coverage enhancement request, a position in which a second aggregation of the PBCHs is to be transmitted may be previously determined or may be set by a higher layer. For example, subframe 1 of a radio frame may be used to transmit the second aggregation of PBCHs to the terminal in the same OFDM symbol in the BS.

In TDD, OFDM symbols 0 to 4 of a first slot may be used to transmit a redundant PBCH. Alternatively, in TDD, a required period may be assumed for terminals limited in redundant PBCH transmission, and every subframe or a subframe transmitting a redundant PBCH may be used as a downlink subframe, rather than an uplink subframe. A legacy terminal cannot be schedule in the subframe switched from uplink to downlink.

For example, a redundant PBCH transmitting the same content in L PBCH1 (subframe #1 of a first radio frame), L PBCH2 (subframe #1 of a second radio frame), L PBCH3 (subframe #1 of a third radio frame), and L PBCH4 (subframe #1 of a fourth radio frame) may be defined. The terminal may determine whether a repeatedly transmitted PBCH exists on the basis of the PBCH transmitted in the subframe #1. A terminal requesting 5 dB coverage enhancement may stop receiving of the PBCH. That is, the terminal may not receive an additional PBCH transmitted to a terminal requesting 10 dB or 20 dB, receive only a PBCH with respect to a 5 dB coverage request, and stop PBCH demodulation.

(3) With respect to a 10 dB coverage enhancement request (in a case where the BS determines to support), a new position of an additional PBCH as in (2) may be selected. For example, subframes 2 and 3 may be used for retransmission. The new position of the additional PBCH may be determined in advance. The accurately same PBCH may be transmitted in the new position. The terminal may detect whether an additional PBCH is transmitted by comparing such a signal with a legacy PBCH signal. Here, in order to allow for an error, detection of a signal may be performed similarly to a PSS detection based on correlation. When a redundant PBCH is required in TDD, an uplink subframe may be used as downlink similar to the 5 dB coverage request.

(4) For a 20 dB coverage enhancement request, the process may be performed on the basis of the procedure similar to (3).

A new position of the PBCH with respect to each level (5 dB, 10 dB, 15 dB, 20 dB) of coverage enhancement may be selected from other radio frame outside of the boundary of 40 msec. For example, a legacy PBCH may be transmitted from SFN=0 to 3. Also, a first aggregation of redundant PBCHs may be transmitted in SFN=4 to 7. In this case, a position of an additional PBCH may be different from the legacy position in order to reduce an influence on the legacy terminal which does not know about the coverage enhancement. For example, a PBCH for the PBCH coverage-limited terminal may be transmitted through 0 to 4 OFDM symbols in a second slot.

According to the present invention, the BS may select a coverage enhancement level with respect to a system layout and a latent terminal, and thus, overhead may be reduced. In other words, a position of the corresponding redundant PBCH may be fixed to correspond to the coverage enhancement level and transmitted from the BS to the terminal. Thus, the BS may perform an operation according to the coverage enhancement request on the basis of the network layout and the latent coverage enhancement request. Also, the terminal may detect the PBCH in a predetermined position on the basis of the coverage request matters of the terminal.

Also, according to an embodiment of the present invention, a random access preamble used by the coverage-limited terminal may be specified to be used. With respect to the coverage-limited terminal, a transmission coverage of Msg 3 (RRC connection request message) may be a burden in terms of uplink transmission. The reason is because it is required to repeatedly transmit Msg3. Thus, the coverage-limited terminal may perform contention-free random access in performing random access. In order for the coverage-limited terminal to perform contention-free random access, paging with respect to the coverage-limited terminal may include a preamble sequence. As the coverage-limited terminal uses a particular preamble sequence in the random access, the coverage-limited terminal may perform contention-free random access without performing contention. In a case where the coverage-limited terminal performs an initial setting, paging may not be set, and thus, the terminal may still need to perform the contention-based random access procedure.

Also, according to an embodiment of the present invention, in a case where PDSCH transmission is performed through TTI bundling, frequency diversity may be used to maximize a diversity gain. As a simple method for enabling PDSCH frequency diversity, resource is frequency-hopped according to a predetermined pattern or the PDCCH transmits information (for example, offset) regarding a frequency hopping pattern to be used for next frequency hopping resource. Here, the offset may be used according to DVRB (distributed virtual resource block) in which a VRB (virtual resource block) index is used instead of a PRB (physical resource block) index to apply the offset to the VRB.

Also, according to an embodiment of the present invention, in order to enhance coverage of PSS/SSS, transmission of a plurality of PSS/SSSs from the BS to the coverage-limited terminal may be considered. In a case where the additional PSS/SSSs are transmitted, a symbol gap between PSS/SSSs and/or a subframe gap between two continuous PSS/SSS pairs may be set, and accordingly, the legacy terminal may be prevented from detecting the additional PSS/SSSs. An example of position of the additional PSS/SSS is as follows.

(1) An OFDM symbol gap between the PSS/SSS may not be 1 with respect to FDD, and may not be limited to −4 with respect to TDD. That is, a subframe gap between the PSS/SSSa may be 2, 3, and 4 in FDD and may be −1 or −2 in TDD. In the present invention, inclusion of other values than the example values is not excluded.

(2) a subframe gap between two continuous PSS/SSS is not limited to 5. That is, two continuous PSS/SSS pars of additional PSS/SSSs may be 1, 2, 3, 6, 7, 8, and 10.

Here, (1) and/or (2) may be used to define positions of the additional PSS/SSSS. If PSS/SSS repetition is required one or more times, the same value may be used as the gap, or a gap having a different value may be used to transmit the repeated PSS/SSSs.

Figure 25:
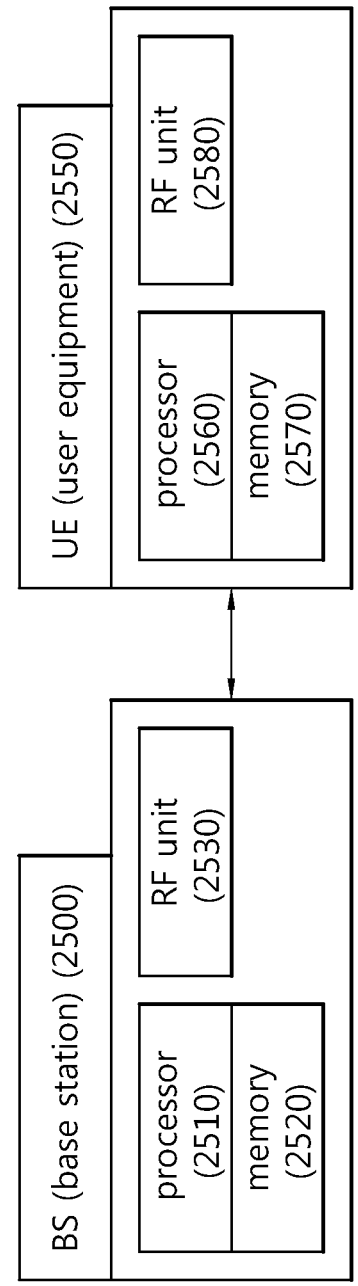
FIG. 25 is a block diagram illustrating a wireless communication system according to an embodiment of the present invention.

FIG. 25 is a block diagram illustrating a wireless communication system according to an embodiment of the present invention.

Referring to FIG. 25, a BS 2500 includes a processor 2510, a memory 2520, and a radio frequency (RF) unit 2530. The memory 2520 is connected to the processor 2510 and stores various information for driving the processor 2510. The RF unit 2520 is connected to the processor 2510 and receives and/or receives a radio signal. The processor 2510 implements the functions, processes and/or methods of FIGS. 1 through 24. In the foregoing embodiment, the operation of the BS may be implemented by the processor 2510.

For example, the processor 2510 may be implemented to receive a coverage enhancement request from the terminal, determine a downlink transmission configuration transmitted to the terminal on the basis of the coverage enhancement request, and transmit downlink data on the basis of the downlink configuration. In particular, the processor 2510 may selectively control power boosting with respect to additional CRC transmission allocation (which includes the entire radio resource including a frequency domain, a particular symbol, a subframe, and the like), the entire symbols or a particular symbol, and configure a MBSFN subframe therefor or control the use of a particular modulation scheme. This also includes selectively configuring a set with respect to reference signals in consideration of collision with a particular reference signal (DM-RS), and the like.

Also, according to the present invention, in order to transmit a particular reference signal, namely, in order to enhance tracking for frequency/time of measurement of a terminal, and cell identification, the processor 2510 may control transmission density of the corresponding reference signal according to a determined group or a variable selection. Also, in order to effectively transmit the reference signals, the processor 2510 may selectively define normal CP/extended CPs to configure a subframe in the terminal and may variably define a channel configuration. To this end, a variable PRACH or an additional/repeated PBCH configuration with respect to a particular terminal may be set. Thus, in order to receive an additional/repeated PBCH by the terminal, as well as general controlling to perform the PRACH, a position regarding the channel configuration (including configuration information including resource information regarding a time/frequency domain) is transmitted to the terminal.

A wireless device 2550 includes a processor 2560, a memory 2570, and an RF unit 2580. The memory 2570 is connected to the processor 2560 and stores various information for driving the processor 2560. The RF unit 2580 is connected to the processor 2560 and receives and/or receives a radio signal. The processor 2560 implements the functions, processes and/or methods of FIGS. 1 through 24. In the foregoing embodiment, the operation of the BS may be implemented by the processor 2560.

For example, the processor 2560 transmits capability information thereof or information including a group regarding a coverage enhancement request of the terminal determined by a BS, and the like, to the BS. In this manner, the processor 2560 may transmit the coverage enhancement request signal regarding capability thereof. Also, the processor 2560 may receive a setting regarding a PRACH variably configured by the BS according to the coverage enhancement request and a configuration regarding TTI bundling regarding downlink data and control/reference signals, and operate variably according to the set configuration information.

For example, the processor 2560 may measure a signal and transmits capability information thereof or a coverage enhancement request of the terminal to the BS in order to request for a required signal according to the measured signal or in consideration of a service required by a user. Also, the processor 2560 receives configuration information of a channel (limited according to characteristics of the terminal) according to the coverage request. Here, the configuration information of the channel includes PRACH/PBCH/PDSCH and information regarding reference signals repeated/added in a predetermined subframe. Thus, the processor 2560 performs the PRACH according to the configured channel setting or controls to receive downlink data. In particular, the processor 2560 checks information regarding additional CRC transmission allocation (which includes the entire radio resource including a frequency domain, a particular symbol, a subframe, and the like), and the entire symbols or a particular symbol, and receive selectively power-boosted channel or receive a corresponding reference signal or a PBCH in an additionally allocated region. Also, through an MBSFN subframe therefor, the processor 2560 may control the use of a particular modulation scheme and receives the reference signals and channels. This includes selectively checking a set with respect to reference signals in consideration of collision with a particular reference signal (DM-RS), and the like, and receives the corresponding signal in the region of the corresponding reference signals.

Thus, according to the present invention, in order to transmit a particular reference signal, namely, in order to enhance tracking for frequency/time of measurement of a terminal, and cell identification, the processor 2560 may receive a signal with increased transmission density of the corresponding reference signal according to a determined group or in a variable position. Here, in order to effectively transmit the reference signals, the processor 2560 may selectively define normal CP/extended CPs to configure a corresponding subframe and may variably define a channel configuration to receive the same. That is, according to variable PRACH configuration and additional/repeated PBCH configuration with respect to a particular terminal, the processor 2560 enhances efficiency of the corresponding service through resource information regarding a time/frequency domain of a additional/repeated PBCH, and also, by receiving a repeatedly transmitted PDSCH, as well as general controlling to perform the PRACH.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for a terminal transmitting and receiving data in a wireless communication system, the method comprising:
   determining, by a terminal, a coverage extension level;
   checking, by the terminal, a channel configuration according to the determined extension level; and
   transmitting and receiving, by the terminal, data to/from a base station (BS) according to the checked channel configuration,
   wherein the channel configuration includes a setting related to a physical broadcast channel (PBCH) and a repetition number or a repetition period of a varied PBCH with respect to the PBCH,
   wherein the channel configuration further includes a setting of a physical random access channel (PRACH), and
   wherein the setting of the PRACH includes information on a period having a value longer than a PRACH configuration period related to a legacy terminal or information on a repetition number of the PRACH which varies according to the coverage extension level of the terminal.

2. The method of claim 1, wherein the setting of the PRACH includes information on uplink radio resource available for random access of a machine-type communication (MTC) terminal, and
   wherein the setting of the PRACH is indicated by a PRACH configuration index including a transmission period having a value longer than 20 ms of the legacy terminal and subframe numbers 0 to 80,
   wherein the PRACH configuration index is set to 64, and
   wherein the setting of the PRACH further includes setting varied according to different repetition numbers.

3. The method of claim 1, further comprising:
   checking, by the terminal, the strength of a downlink signal and variably setting an index for a request of coverage enhancement according to the strength of the signal,
   wherein the index is set to a level that corresponds to the strength of the downlink signal, and
   wherein the index is set to a level less than or equal to a coverage request group determined for the terminal by the BS.

4. The method of claim 3, further comprising:
   checking a setting on a variably configured PRACH according to the request of the coverage enhancement,
   wherein the transmission number of the variably configured PRACH increases by double to correspond to a previous PRACH transmission number, as the level of the index increases.

5. The method of claim 1, wherein the checking of the channel configuration comprises:
   checking system information including information indicating that the terminal is a coverage-limited terminal, and
   checking a setting on a variously configured PBCH according to the system information.

6. The method of claim 5, further comprising:
   checking a setting of the variably configured PBCH according to the coverage enhancement request,
   wherein the setting of the variably configured PBCH includes information on a repeated transmission of the PBCH and a transmission of a new PBCH, and
   wherein the repeated transmission of the PBCH and the transmission of a new PBCH is performed on variable positions through OFDM symbols excluding symbols used for a physical downlink control channel (PDCCH).

7. The method of claim 6, wherein the repeated transmission of the PBCH and the transmission of a new PBCH performed on a set including different OFDM symbols, different subframes, and different frequencies variably determined according to an index for the coverage enhancement request.

8. The method of claim 7, wherein the repeated transmission of the PBCH and the transmission of a new PBCH performed on one or two physical resource blocks (PRBs), and
   wherein power of the PBCH transmitted through the one or two PRBs is 6-fold or 3-fold boosted so as to be set to be equal to power used in 6 PRBs allocated for PBCH transmission.

9. The method of claim 1, wherein the checking of the channel configuration includes:
   checking a setting regarding a physical downlink shared channel (PDSCH), and
   checking a setting of a transmission time interval (TTI) bundling regarding the variably set PDSCH according to the coverage enhancement request,
   wherein the number of TTI bundling increases as the level of the index increases.

10. An apparatus for receiving downlink data in a wireless communication system, the apparatus comprising:
    a radio frequency (RF) unit that transmits and receives signals to and from a base station (BS); and
    a processor, connected to the RF unit, that:
    determines a coverage extension level,
    checks a channel configuration according to the determined extension level, and
    controls the RF unit to transmit and receive data to/from the BS according to the checked channel configuration,
    wherein the channel configuration includes a setting related to a physical broadcast channel (PBCH) and a repetition number or a repetition period of varied PBCH with respect to the PBCH
    wherein the channel configuration further includes a setting of a physical random access channel (PRACH), and
    wherein the setting of the PRACH includes information on a period having a value longer than a PRACH configuration period related to a legacy terminal or information on a repetition number of the PRACH varied according to the coverage extension level of the terminal.

11. The apparatus of claim 10, wherein the processor further:
    checks that a PRACH configuration index of the channel configuration is set to 64,
    checks information on uplink radio resource available for random access of a machine-type communication (MTC) terminal according to the PRACH configuration index, and
    sets the RACH or checks that the setting is differently set according to different repetition numbers according to a transmission period having a value longer than 20 ms of the legacy terminal and a PRACH configuration index including 0 or 80 subframe numbers, confirms the setting of the PRACH determined variably according to different repetition numbers.

12. The apparatus of claim 10, wherein the processor further:
checks the strength of a downlink signal of the terminal,
variably sets an index for the coverage enhancement request according to the strength of the signal,
sets the index to a level that corresponds to the strength of the downlink signal, and
sets the index to a level less than or equal to a coverage request group determined for the terminal by the BS.

13. The apparatus of claim 10, wherein the processor further:
checks a setting regarding a variably configured physical random access channel (PRACH) according to the coverage enhancement request, and
checks that the transmission number of the PRACH increases by double to correspond to a previous PRACH transmission number, as the level of the index increases.

14. The apparatus of claim 10, wherein the processor further:
checks a setting of the variably configured PBCH according to the coverage enhancement request,
checks that the setting of the variably configured PBCH includes information on a repeated transmission of the PBCH and a transmission of a new PBCH, and
checks that the repeated transmission of the PBCH and the transmission of a new PBCH is performed on variable positions through OFDM symbols excluding symbols used for a physical downlink control channel (PDCCH),
wherein the repeated transmission of the PBCH and the transmission of a new PBCH performed on a set including different OFDM symbols, different subframes, and different frequencies variably determined according to an index for the coverage enhancement request,
wherein the repeated transmission of the PBCH and the transmission of a new PBCH performed on one or two physical resource blocks (PRBs), and
wherein power of the PBCH transmitted through the one or two PRBs is 6-fold or 3-fold boosted so as to be set to be equal to power used in 6 PRBs allocated for PBCH transmission.

15. The apparatus of claim 10, wherein the processor further:
checks a setting regarding a physical downlink shared channel (PDSCH), and
checks a setting of a transmission time interval (TTI) bundling regarding the variably set PDSCH according to the coverage enhancement request,
wherein the number of TTI bundling increases as the level of the index increases.

* * * * *